United States Patent
Inoue

(10) Patent No.: US 11,704,126 B2
(45) Date of Patent: Jul. 18, 2023

(54) NON-TRANSITORY RECORDING MEDIUM HAVING COMPUTER-READABLE PROGRAM RECORDED THEREON, SERVER APPARATUS, FUNCTION GRAPH DISPLAY CONTROL APPARATUS, AND FUNCTION GRAPH DISPLAY CONTROL METHOD

(71) Applicant: CASIO COMPUTER CO., LTD., Tokyo (JP)

(72) Inventor: Takayuki Inoue, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 923 days.

(21) Appl. No.: 16/386,919

(22) Filed: Apr. 17, 2019

(65) Prior Publication Data
US 2019/0317764 A1 Oct. 17, 2019

(30) Foreign Application Priority Data
Apr. 17, 2018 (JP) .................................. 2018-079416

(51) Int. Cl.
*G06F 3/04847* (2022.01)
*G06T 11/20* (2006.01)
(Continued)

(52) U.S. Cl.
CPC ........ *G06F 9/3004* (2013.01); *G06F 3/04847* (2013.01); *G06F 17/13* (2013.01); *G06T 11/206* (2013.01); *G09B 19/025* (2013.01)

(58) Field of Classification Search
CPC .... G06F 9/3004; G06F 3/04847; G06F 17/13; G06F 17/10; G09B 19/025
See application file for complete search history.

(56) References Cited

U.S. PATENT DOCUMENTS 5,615,347 A * 3/1997 Davis .................. G06F 3/04847
715/833
2004/0114258 A1* 6/2004 Harris, III ............. G06F 40/166
359/841

(Continued)

FOREIGN PATENT DOCUMENTS

JP H07-146947 A 6/1995
JP 2015-125718 A 7/2015

(Continued)

OTHER PUBLICATIONS

Desmos, the desmos user guide (translated by Yuto Horikawa [online], [searched on Apr. 16, 2018], Internet <URL: https://desmos.s3.amazonaws.com/Desmos_User_Guide_JA.pdf>).

(Continued)

*Primary Examiner* — John T Repsher, III
(74) *Attorney, Agent, or Firm* — Scully, Scott, Murphy & Presser, P.C.

(57) ABSTRACT

A non-transitory recording medium records a program that causes a computer to execute a process of causing a display to display, in response to one or more input operations accepted via an input device, one first mathematical expression display area including one first mathematical expression, one first graph display area associated with the one first mathematical expression display area, one first slider display area associated with the one first graph display area, one second mathematical expression display area including one second mathematical expression, one second graph display area which is associated with the one second mathematical expression display area and is an area different from the one first graph display area, and one second slider display area which is associated with the one second graph display area and is an area different from the one first slider display area.

14 Claims, 13 Drawing Sheets

(51) Int. Cl.
    *G06F 9/30*         (2018.01)
    *G06F 17/13*       (2006.01)
    *G09B 19/02*     (2006.01)

(56) References Cited

U.S. PATENT DOCUMENTS

| | | | | |
|---|---|---|---|---|
| 2014/0365947 | A1* | 12/2014 | Karoji | G06F 3/04847 715/773 |
| 2015/0187106 | A1 | 7/2015 | Endo | |
| 2017/0199944 | A1* | 7/2017 | Ashoori | G06F 16/904 |

FOREIGN PATENT DOCUMENTS

| | | |
|---|---|---|
| JP | 2015-125737 A | 7/2015 |
| JP | 2017-016545 A | 1/2017 |
| JP | 2018-049495 A | 3/2018 |

OTHER PUBLICATIONS

Notice of Reasons for Refusal dated Feb. 22, 2022 received in Japanese Patent Application No. JP 2018-079416 together with an English language translation.

* cited by examiner

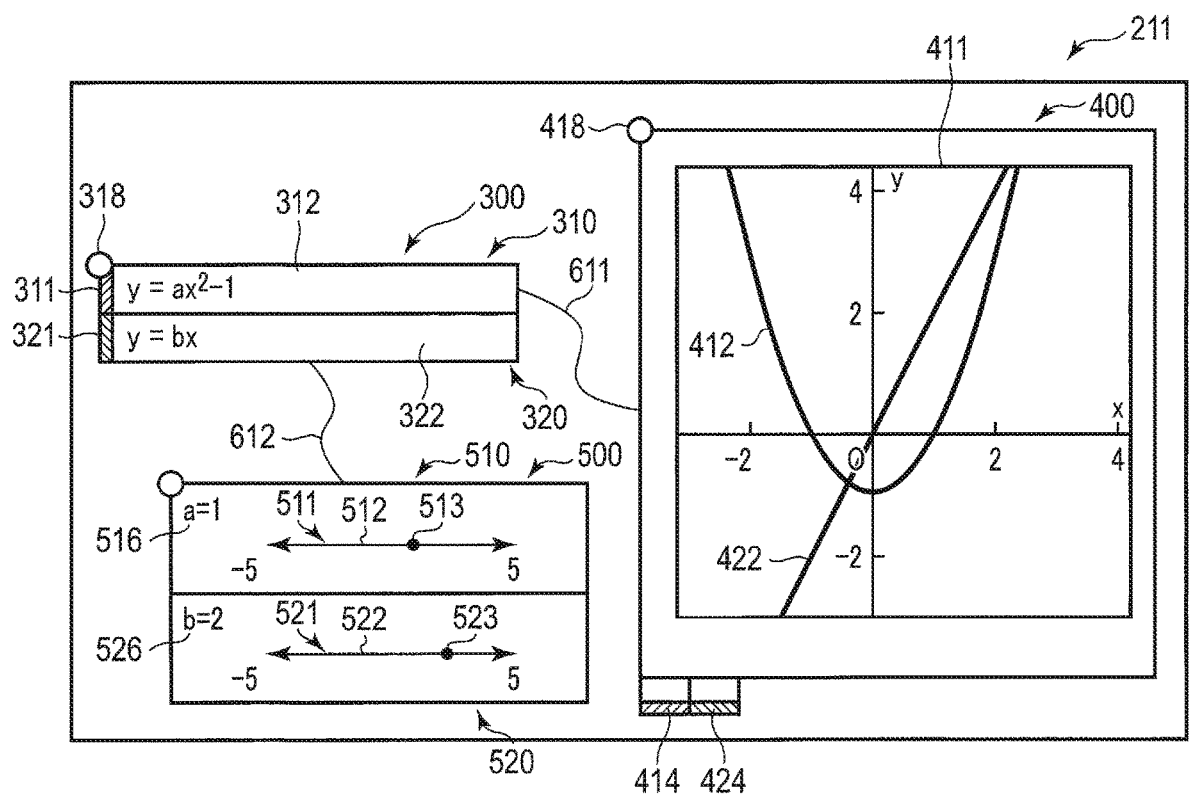
F I G. 6D

NON-TRANSITORY RECORDING MEDIUM HAVING COMPUTER-READABLE PROGRAM RECORDED THEREON, SERVER APPARATUS, FUNCTION GRAPH DISPLAY CONTROL APPARATUS, AND FUNCTION GRAPH DISPLAY CONTROL METHOD

CROSS-REFERENCE TO RELATED APPLICATION

This application is based upon and claims the benefit of priority from the prior Japanese Patent Application No. 2018-079416, filed Apr. 17, 2018, the entire contents of which are incorporated herein by reference.

BACKGROUND

1. Technical Field

The technical Field relates to a non-transitory recording medium having a computer-readable program recorded thereon, a server apparatus, a function graph display control apparatus, and a function graph display control method.

2. Description of the Related Art

There is known a graph drawing application which can be used on a Web browser. For example, Desmos, the desmos user guide (translated by Yuto Horikawa [online], [searched on Apr. 16, 2018], Internet <URL:https://desmos.s3.amazonaws.com/Desmos_User_Guide_JA.pdf>) discloses the following application, which operates on a Web browser. In this application, an arithmetic operation is performed based on a mathematical expression which a user inputs to an equation list, and a graph based on the result of the arithmetic operation is drawn on the Web browser.

In the above-described application, one or more data input areas, to which input data (e.g. a mathematical expression, or a numerical table) is to be input by the user, are displayed within one window of the Web browser. However, only one data output area is displayed when output data (e.g. a graph) based on the input data to the data input area is displayed. Thus, in order to display a plurality of data output areas on one display, there is no choice but to open a plurality of windows of the Web browser, and to display the data output areas one by one on each window.

In this case, it is not possible to perform an operation of coupling a plurality of data input areas which are associated with the data output areas, or coupling a plurality of operator areas for changing numerical values of character variables in a plurality of mathematical expressions included in the data input areas, or to perform an operation of separating the coupled data input areas or the coupled operator areas. By extension, a concrete operation method for coupling/separating the data input areas or the operator areas, or a concrete display method at a time of associating and displaying the data input areas or the operator areas when the coupling/separation operation is performed, is unclear.

In this manner, in the conventional application, from at least one of the above-described standpoints, there is room to improve the operability or convenience at a time of display-outputting, on the display, the data input areas, and the data output areas and operator areas associated with the data input areas.

BRIEF SUMMARY

According to a first aspect of embodiments, there is provided a non-transitory recording medium having a program recorded thereon capable of causing a computer to execute a process of: causing a display to display, in response to one or more input operations accepted via an input device, one first mathematical expression display area including one first mathematical expression; one first graph display area associated with the one first mathematical expression display area, the one first graph display area including one first graph corresponding to the one first mathematical expression; one first slider display area associated with the one first graph display area, the one first slider display area including one or more sliders each for changing a numerical value of each of one or more kinds of character coefficients included in the one first mathematical expression, the one or more sliders corresponding to the one or more character coefficients on one-to-one basis, and a number of the sliders being equal to a number of kinds of the one or more kinds of character coefficients; one second mathematical expression display area including one second mathematical expression; one second graph display area associated with the one second mathematical expression display area, the one second graph display area being an area different from the one first graph display area, the one second graph display area including one second graph corresponding to the one second mathematical expression; and one second slider display area associated with the one second graph display area, the one second slider display area being an area different from the one first slider display area, the one second slider display area including one or more sliders for changing a numerical value of each of one or more kinds of character coefficients included in the one second mathematical expression, the sliders corresponding to the respective character coefficients, a number of the sliders being equal to a number of kinds of the one or more kinds of character coefficients.

According to a second aspect of embodiments, there is provided a server apparatus storing a program in a storage, the server apparatus being configured to transmit the program to a client terminal that communicates with the server apparatus via a network, the program capable of causing a computer to execute a process of: causing a display to display, in response to one or more input operations accepted via an input device, one first mathematical expression display area including one first mathematical expression; one first graph display area associated with the one first mathematical expression display area, the one first graph display area including one first graph corresponding to the one first mathematical expression; one first slider display area associated with the one first graph display area, the one first slider display area including one or more sliders each for changing a numerical value of each of one or more kinds of character coefficients included in the one first mathematical expression, the one or more sliders corresponding to the one or more character coefficients on one-to-one basis, and a number of the sliders being equal to a number of kinds of the one or more kinds of character coefficients; one second mathematical expression display area including one second mathematical expression; one second graph display area associated with the one second mathematical expression display area, the one second graph display area being an area different from the one first graph display area, the one second graph display area including one second graph corresponding to the one second mathematical expression; and one second slider display area associated with the one second graph display area, the one second slider display area being an area different from the one first slider display area, the one second slider display area including one or more sliders for changing a numerical value of each of one or more kinds of character coefficients included in the one second mathematical expression, the sliders corresponding to the respective character coefficients, a number of the sliders being equal to a number of kinds of the one or more kinds of character coefficients.

According to a third aspect of embodiments, there is provided a function graph display control apparatus comprising a processor and a storage, the processor being configured to be capable of executing, by executing instructions stored in the storage, a process of: causing a display to display, in response to one or more input operations accepted via an input device, one first mathematical expression display area including one first mathematical expression; one first graph display area associated with the one first mathematical expression display area, the one first graph display area including one first graph corresponding to the one first mathematical expression; one first slider display area associated with the one first graph display area, the one first slider display area including one or more sliders each for changing a numerical value of each of one or more kinds of character coefficients included in the one first mathematical expression, the one or more sliders corresponding to the one or more character coefficients on one-to-one basis, and a number of the sliders being equal to a number of kinds of the one or more kinds of character coefficients; one second mathematical expression display area including one second mathematical expression; one second graph display area associated with the one second mathematical expression display area, the one second graph display area being an area different from the one first graph display area, the one second graph display area including one second graph corresponding to the one second mathematical expression; and one second slider display area associated with the one second graph display area, the one second slider display area being an area different from the one first slider display area, the one second slider display area including one or more sliders for changing a numerical value of each of one or more kinds of character coefficients included in the one second mathematical expression, the sliders corresponding to the respective character coefficients, a number of the sliders being equal to a number of kinds of the one or more kinds of character coefficients.

According to a fourth aspect of embodiments, there is provided a function graph display control method comprising a process of: causing a display to display, in response to one or more input operations accepted via an input device, one first mathematical expression display area including one first mathematical expression; one first graph display area associated with the one first mathematical expression display area, the one first graph display area including one first graph corresponding to the one first mathematical expression; one first slider display area associated with the one first graph display area, the one first slider display area including one or more sliders each for changing a numerical value of each of one or more kinds of character coefficients included in the one first mathematical expression, the one or more sliders corresponding to the one or more character coefficients on one-to-one basis, and a number of the sliders being equal to a number of kinds of the one or more kinds of character coefficients; one second mathematical expression display area including one second mathematical expression; one second graph display area associated with the one second mathematical expression display area, the one second graph display area being an area different from the one first graph display area, the one second graph display area including one second graph corresponding to the one second mathematical expression; and one second slider display area associated with the one second graph display area, the one second slider display area being an area different from the one first slider display area, the one second slider display area including one or more sliders for changing a numerical value of each of one or more kinds of character coefficients included in the one second mathematical expression, the sliders corresponding to the respective character coefficients, a number of the sliders being equal to a number of kinds of the one or more kinds of character coefficients.

BRIEF DESCRIPTION OF THE DRAWINGS

The components in the drawings are not necessarily to scale relative to each other.

FIG. 6D is a view for describing the separation and coupling of tags, and the change of the coefficient by the slider, FIG. 6D illustrating an example of the transition of the screen displayed on the terminal.

DETAILED DESCRIPTION

An embodiment of the present invention will now be described with reference to the accompanying drawings.

The present embodiment relates to an application which utilizes a Web and is used in the scene of school education, etc. The application of this embodiment is used, in particular, in the education of mathematics.

[Configuration of System]

Figure 1:
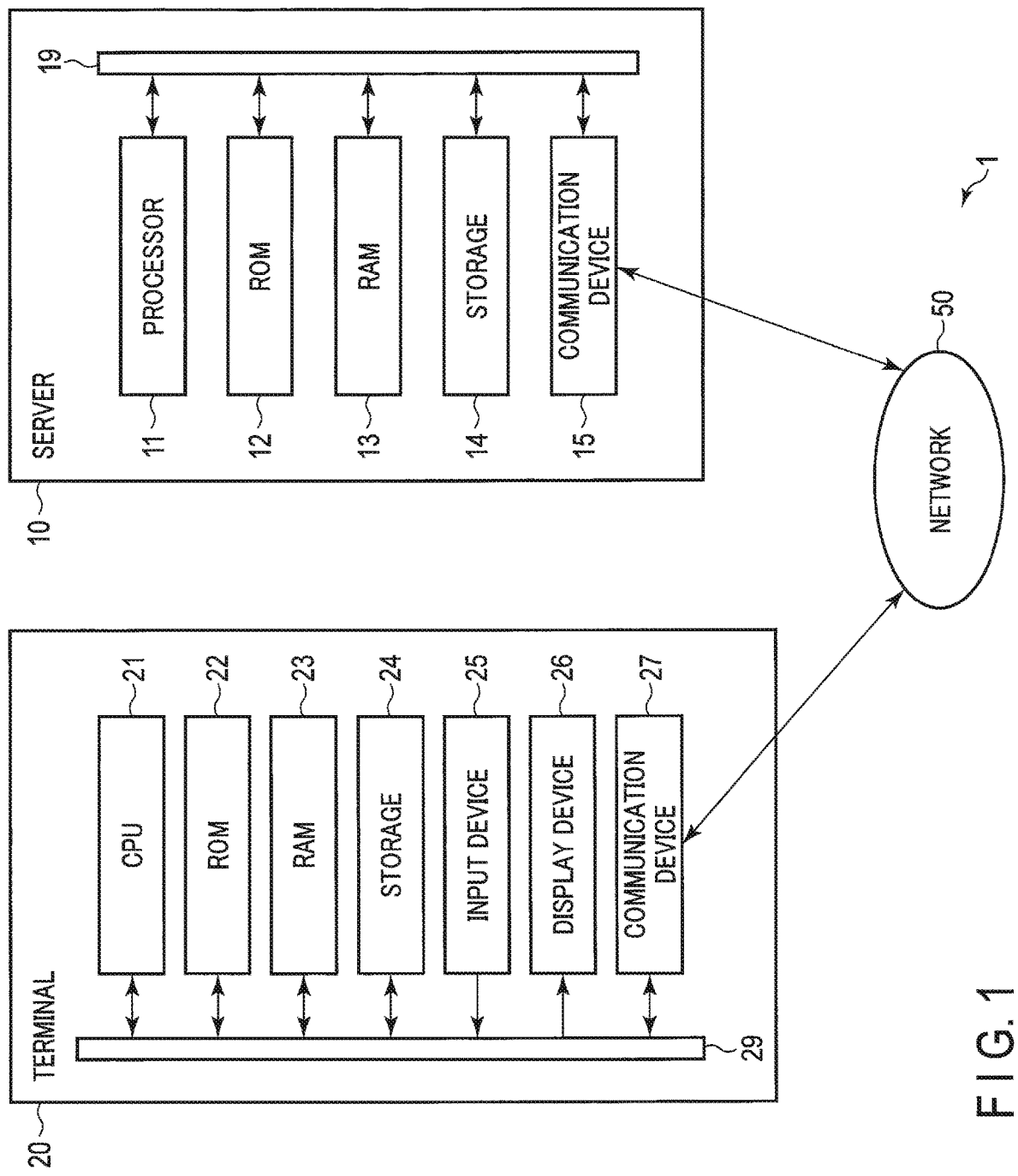
FIG. 1 is a block diagram illustrating the outline of a configuration example of a system according to an embodiment.

FIG. 1 is a view illustrating the outline of a configuration example of a system 1 according to the present embodiment, the system 1 including a server 10 and a terminal 20 serving as a client. The terminal (function graph display control apparatus) 20 is, for example, an apparatus such as a personal computer (PC), a tablet-type information terminal or a smartphone. In each terminal, a Web browser operates. Using the Web browser, each terminal accesses the server 10 via a network 50 such as the Internet, and executes a Web application.

Although FIG. 1 illustrates one terminal 20, the number of terminals included in the system 1 may be any number. Any number of terminals may access the server 10 and may execute the Web application.

As illustrated in FIG. 1, the terminal 20 includes a Central Processing Unit (CPU) 21, a Read Only Memory (ROM) 22, a Random Access Memory (RAM) 23, a storage 24, an input device (input device) 25, a display device (display) 26 and a communication device 27, which are mutually connected via a bus line 29. The CPU (processor) 21 executes various kinds of signal processing, etc. An integrated circuit, such as an Application Specific Integrated Circuit (ASIC), a Field Programmable Gate Array (FPGA) or a Graphics Processing Unit (GPU), may be used in place of the CPU or together with the CPU. Specifically, various kinds of processors may be used in the terminal 20. The ROM 22 stores a boot program, etc. The RAM 23 functions as a main memory device of the CPU 21. As the RAM 23, for example, a Dynamic RAM (DRAM) or a Static RAM (SRAM) may be used. As the storage 24, for example, a Hard Disk Drive (HDD), a Solid State Drive (SSD) or an Embedded Multi Media Card (eMMC) is used. The storage 24 stores programs used in the CPU 21, and various kinds of information, such as parameters. The RAM 23 and storage 24 are not limited to these, and may be replaced with various kinds of other memory devices. The input device 25 is, for example, a keyboard, a mouse, a touch panel, etc. The display device 26 is, for example, a liquid crystal display, an organic EL display, etc. The communication device 27 is used at a time of communicating with a device outside the terminal 20. The communication device 27 is connected to the network 50 such as the Internet.

As illustrated in FIG. 1, the server 10 is an information processing apparatus including a processor 11, a ROM 12, a RAM 13, a storage 14 and a communication device 15, which are mutually connected via a bus line 19. The processor 11 executes various kinds of signal processing, etc. The ROM 12 stores information used in the operation of the processor 11. The RAM 13 functions as a main memory device of the processor 11. As the storage 14, various kinds of storage media may be used. The storage 14 stores programs used in the processor 11, and various kinds of information such as parameters.

[Example of Screen]

An example of a screen, which is displayed on the display device 26 of the terminal 20 of the present embodiment, will be described with reference to FIG. 5A. In this embodiment, an input and a display are executed by using a combination of display areas each having a small frame called "tag". There are a plurality of kinds of tags. A screen 203 illustrated in FIG. 5A includes a mathematical expression tag 300, a graph tag 400 and a slider tag 500. The mathematical expression tag 300 is a tag to which a mathematical expression representing a function is input. It can be said that the mathematical expression tag is a mathematical expression display area including a mathematical expression representing a function. The graph tag 400 is a tag in which a graph is drawn. It can be said that the graph tag 400 is a graph display area including a graph corresponding to the mathematical expression. The slider tag 500 is a tag which displays a value that is substituted for a character coefficient when a mathematical expression input to the mathematical expression tag includes the character coefficient, and which displays a slider for changing the value. It can be said that the slider tag 500 is a slider display area including the character coefficient and slider. When there are a plurality of kinds of character coefficients, a plurality of combinations of character coefficients and sliders are displayed in juxtaposition, the number of combinations corresponding to the number of kinds of character coefficients.

Mutually associated tags are connected by a line called "string". For example, the mathematical expression tag 300 and graph tag 400 are associated by a string 611. The graph tag 400 and the slider tag 500 are associated by a string 612.

Figure 5A:
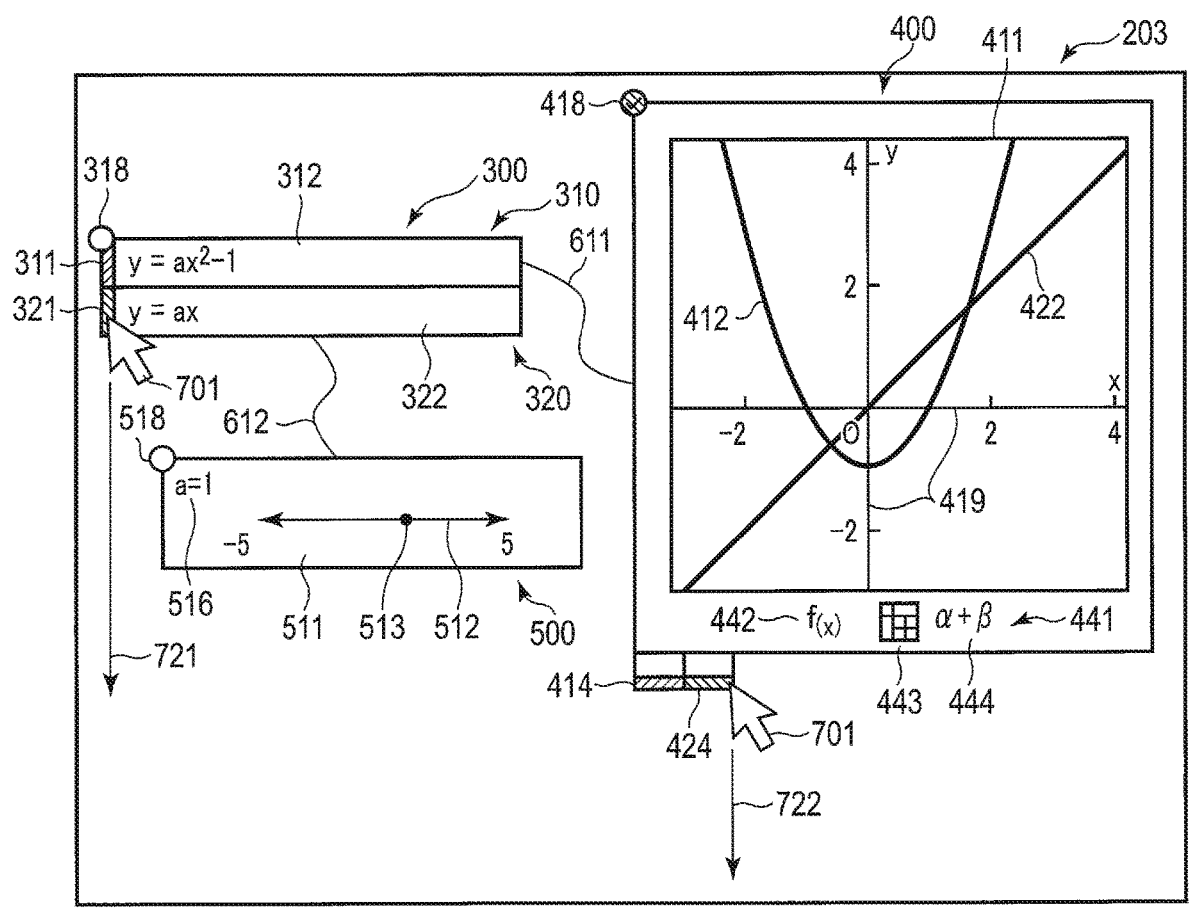
FIG. 5A is a view for describing separation and coupling of tags, and a change of a coefficient by a slider, FIG. 5A illustrating an example of the transition of the screen displayed on the terminal.

In the example of the screen 203 illustrated in FIG. 5A, the mathematical expression tag 300 includes two tags, namely a first mathematical expression tag 310 and a second mathematical expression tag 320. Each tag includes a tab and a display area. Specifically, the first mathematical expression tag 310 includes a first tab 311 and a first input area 312. The second mathematical expression tag 320 includes a second tab 321 and a second input area 322. The color of the first tab 311 is different from the color of the second tab 321. In the example of FIG. 5A, an equation "$y=ax^2-1$" is input to the first input area 312 of the first mathematical expression tag 310. An equation "$y=ax$" is input to the second input area 322 of the second mathematical expression tag 320. A status display portion 318 is provided on an upper left part of the mathematical expression tag 300.

The slider tag 500 is associated with the mathematical expression tag 300 by the string 612. Since the mathematical expressions input to the mathematical expression tag 300 are "$y=ax^2-1$" and "$y=ax$", the character coefficient included in these mathematical expressions is one common "a". Accordingly, the number of slider tags 500 associated with the mathematical expression tag 300 is one. The slider tag 500 includes a slider 511 and a value display area 516. The value display area 516 displays "a=1" which indicates that the character coefficient "a" of the mathematical expressions input to the mathematical expression tag 300 is "1". The slider 511 is configured such that a marker 513 moves along an axis 512. The value of the character coefficient displayed on the value display area 516 varies in accordance with the position of the marker 513. A status display portion 518 is provided on an upper left part of the slider tag 500.

The graph tag 400 is associated with the mathematical expression tag 300 by the string 611. The graph tag 400 includes a first graph display area 411 including axes 419. The first graph display area 411 displays a coordinate range which is preset or is set in accordance with a user operation. In the example of the screen 203 illustrated in FIG. 5A, the X coordinate of the coordinate range is "$-3.2 \leq X \leq 4.1$", and the Y coordinate of the coordinate range is "$-3.1 \leq X \leq 4.2$." Specifically, the minimum value X min and maximum value X max of the X coordinate are −3.2 and 4.1, respectively, and the minimum value Ymin and maximum value Ymax of the Y coordinate are −3.1 and 4.2, respectively.

The first graph display area 411 displays a first graph 412 indicating "$y=ax^2-1$" corresponding to the first mathematical expression tag 310. The first graph display area 411 displays a second graph 422 indicating "$y=ax$" corresponding to the second mathematical expression tag 320. Here, the value indicated in the slider tag 500 is substituted for the character coefficient "a". Specifically, in the example illustrated in FIG. 5A, the first graph 412 indicates "$y=x^2-1$", and the second graph 422 indicates "$y=x$". The graph tag 400 includes a first tab 414 and a second tab 424. The color of the first tab 414 of the graph tag 400 is the same as the color of the first tab 311 of the mathematical expression tag 300. The color of the second tab 424 of the graph tag 400 is the same as the color of the second tab 321 of the mathematical expression tag 300. It is preferable that the display color of the first graph 412 is the same as the color of the first tab 311 of the mathematical expression tag 300 and the first tab 414 of the graph tag. Similarly, it is preferable that the display color of the second graph 422 is the same as the color of the second tab 321 of the mathematical expression tag 300 and the second tab 424 of the graph tag. A status display portion 418 is provided on an upper left part of the graph tag 400.

The status display portion 318 of the mathematical expression tag 300, the status display portion 518 of the slider tag 500 and the status display portion 418 of the graph tag 400 indicate which of the mathematical expression tag 300, slider tag 500 and graph tag 400 is in the selected state. In the example illustrated in FIG. 5A, since the graph tag 400 is selected, the color of the status display portion 418 of the graph tag 400 becomes a deep color, and a check mark is displayed. By selecting, for example, the status display portion by a left click of the mouse and dragging the status display portion, the user can move the corresponding tag on the screen 203. Although the drag operation using the mouse is described here, the same applies to a drag operation using the touch panel. In the description below, too, the drag operation is intended to mean such an operation as to move a target.

In the example illustrated in FIG. 5A, the graph tag 400 is selected. A menu display 441 is included in the selected graph tag. The menu display 441 includes a mathematical expression tag icon 442, a numerical table tag icon 443 and an arithmetic operation tag icon 444. The mathematical expression tag icon 442 is an icon which is selected in order to create a new mathematical expression tag. The numerical table tag icon 443 is an icon which is selected in order to newly create a numerical table tag including a numerical table. The arithmetic operation tag icon 444 is an icon which is selected in order to newly create an arithmetic operation tag to which formulae for various arithmetic operations are input and on which arithmetic operation results are displayed.

In the present embodiment, as illustrated in FIG. 5A, the mathematical expression tag 300 includes a plurality of mathematical expression tags (first mathematical expression tag 310 and second mathematical expression tag 320) which are displayed in a mutually coupled state, and a plurality of graphs (first graph 412 and second graph 422) corresponding to the tabs of the mathematical expression tag 300 are displayed on the first graph display area 411 of one graph tag 400. At this time, in accordance with a user operation, these mathematical expression tags (first mathematical expression tag 310 and second mathematical expression tag 320) can be displayed in a mutually separated state. At the same time, a new graph tag can be created additionally displayed in the screen 203, and a plurality of graph tags can be displayed in the same screen. The plural mathematical expression tags and the plural graph tags, which are displayed in the same screen, are mutually associated. The graph tag, which is associated with the first mathematical expression tag 310, displays the graph corresponding to the mathematical expression that is input to the first mathematical expression tag 310. The graph tag, which is associated with the second mathematical expression tag 320, displays the graph corresponding to the mathematical expression that is input to the second mathematical expression tag 320. When a character coefficient is included in the mathematical expression that is input to the separated first mathematical expression tag 310, a slider tag relating to this character coefficient is created in association with the first mathematical expression tag 310. When a character coefficient is included in the mathematical expression that is input to the separated second mathematical expression tag 320, a slider tag relating to this character coefficient is created in association with the second mathematical expression tag 320.

Furthermore, a plurality of numerical expression tags can be coupled, and graph tags can be coupled. The numerical expression tags, when coupled, are displayed in juxtaposition. A plurality of graphs are displayed by being overlapped on one graph tag. A plurality of slider tags are displayed in juxtaposition.

[System Operation]

The system 1 according to the present embodiment includes many functions. Some examples of the functions will be described. Each function is realized by cooperation between the terminal 20 and server 10. For example, when the terminal 20, in which the Web browser operates, has accessed the server 10, the terminal 20 acquires a program from the server 10. The terminal 20 executes this program on the Web browser. The terminal 20 executes various arithmetic operations and displays, based on information which the user inputs on the Web browser by operating the input device 25 of the terminal 20. When an arithmetic operation by the server 10 is necessary, the terminal 20 transmits information necessary for the arithmetic operation to the server 10. Based on the information acquired from the terminal 20, the server 10 executes various arithmetic operations and transmits the arithmetic operation result to the terminal 20. Based on the information acquired from the server 10, the terminal 20 displays various images on the display device 26.

Figure 2A:
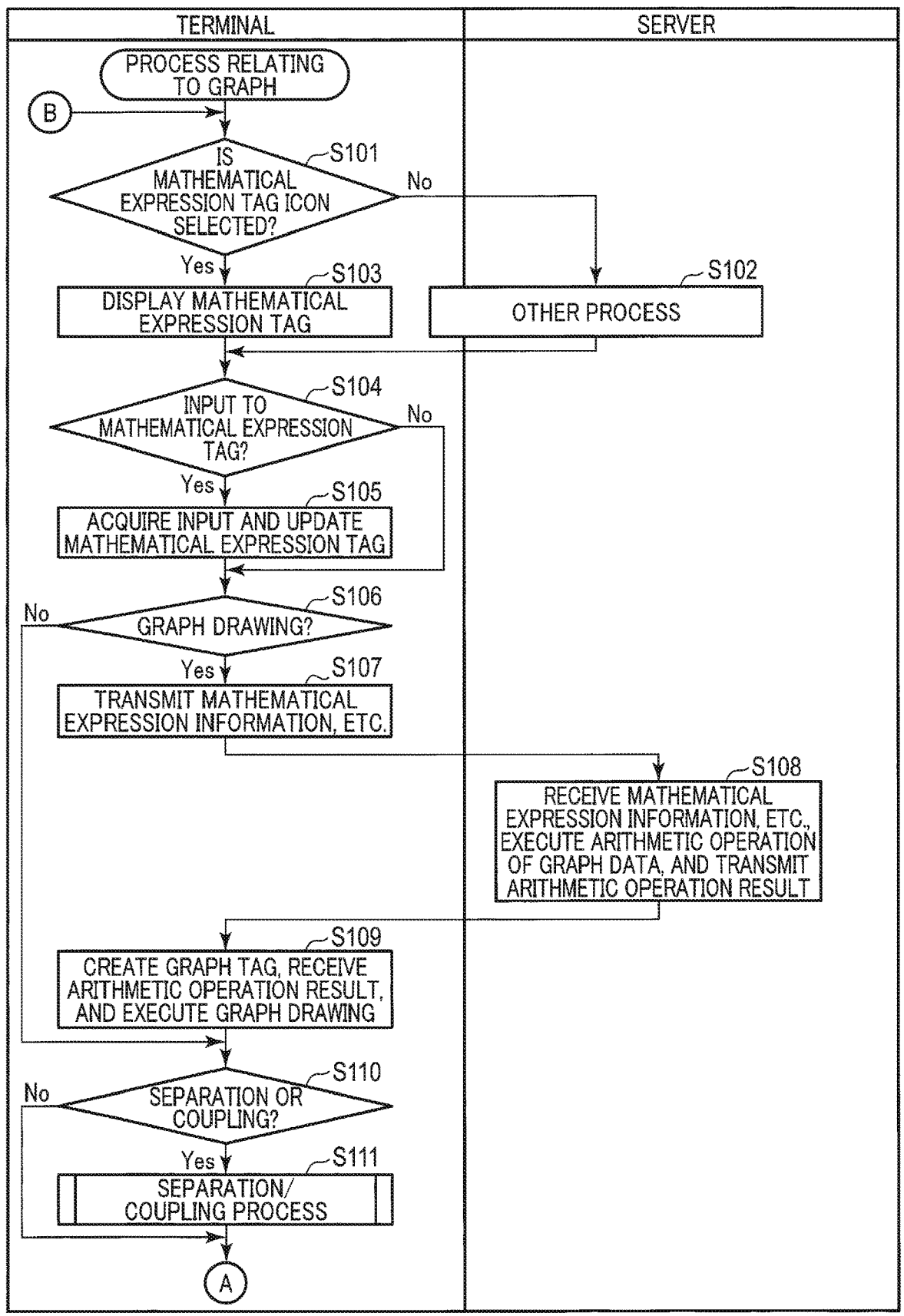
FIG. 2A is a flowchart illustrating the outline of an example of an operation of the system.
Figure 2B:
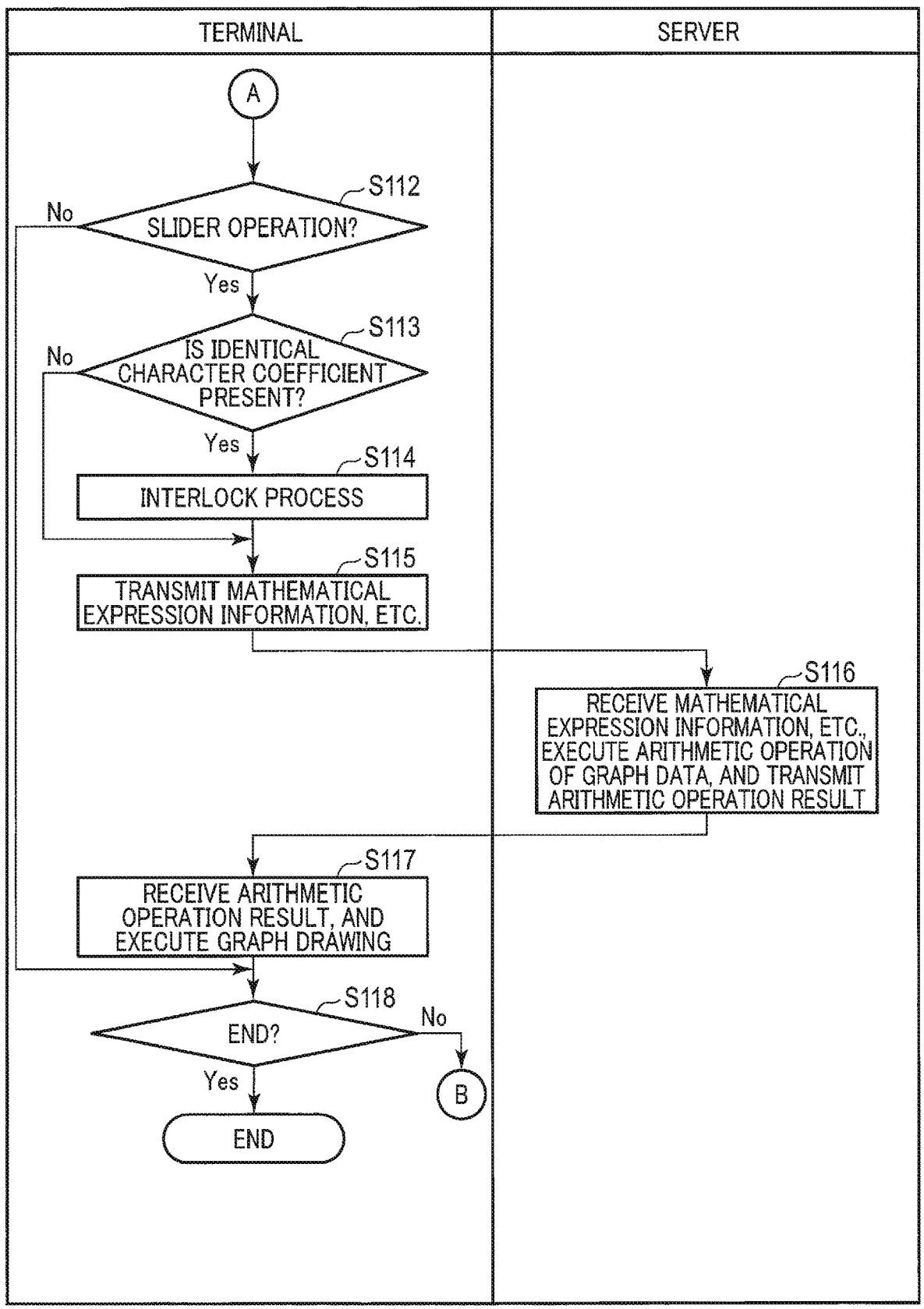
FIG. 2B is a flowchart illustrating the outline of the example of the operation of the system.
Figure 3:
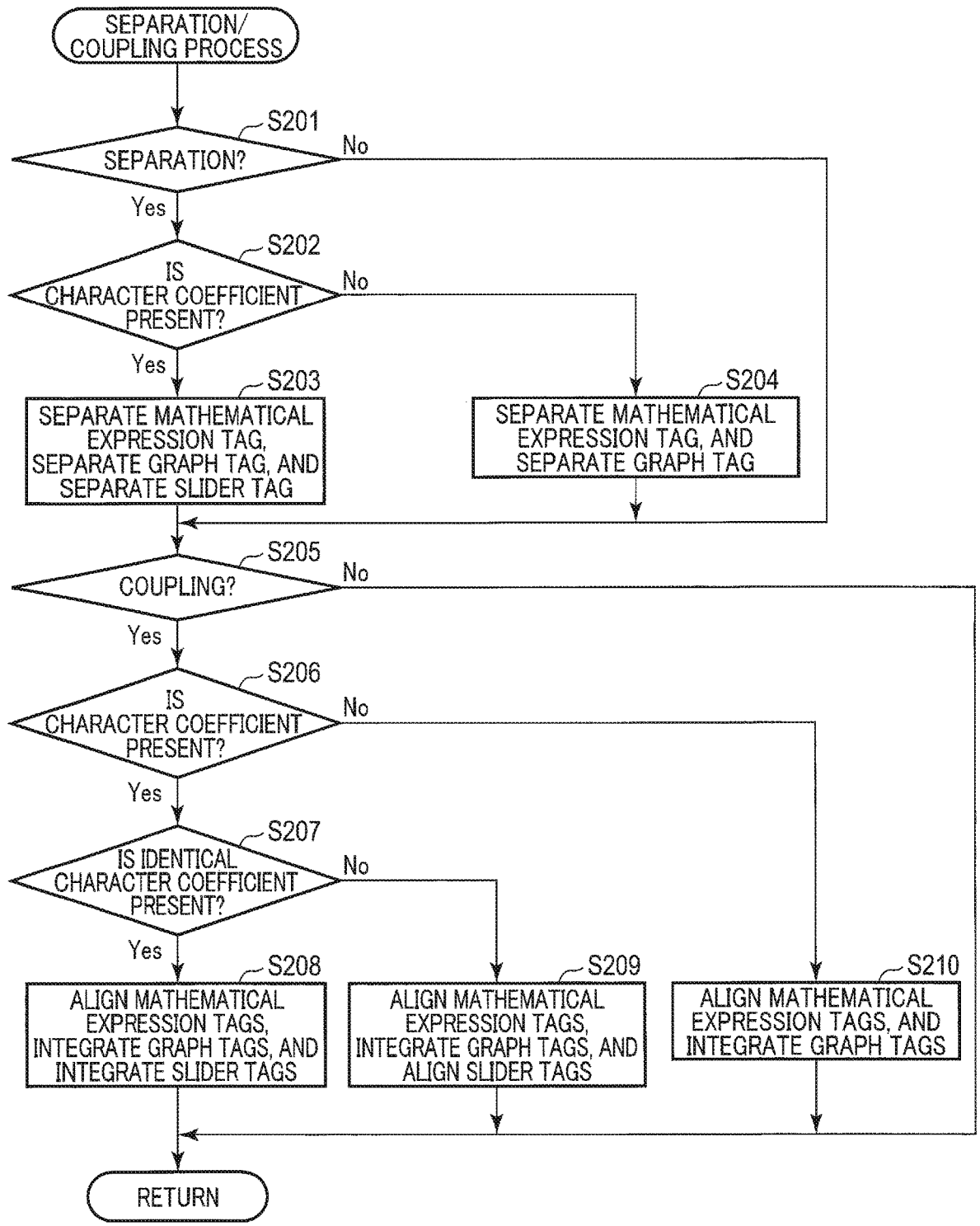
FIG. 3 is a flowchart illustrating the outline of an example of a separation/coupling process.
Figure 4A:
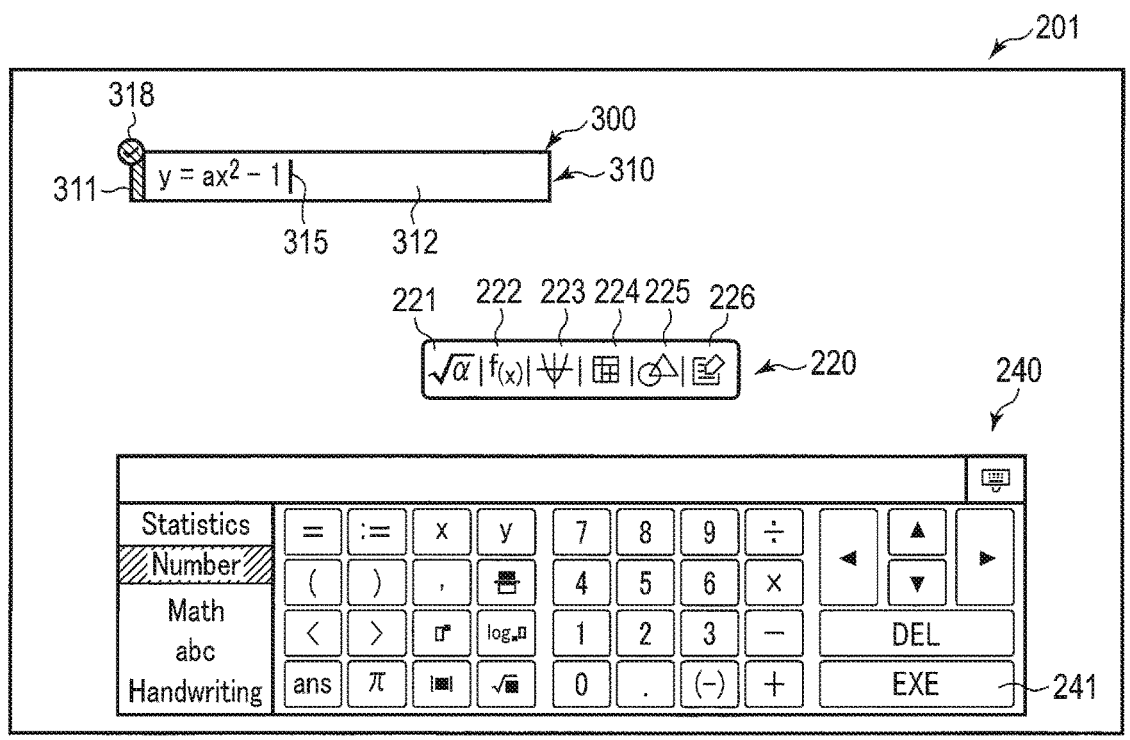
FIG. 4A is a view for describing an operation of creating tags, FIG. 4A illustrating an example of a transition of a screen displayed on a terminal.
Figure 4B:
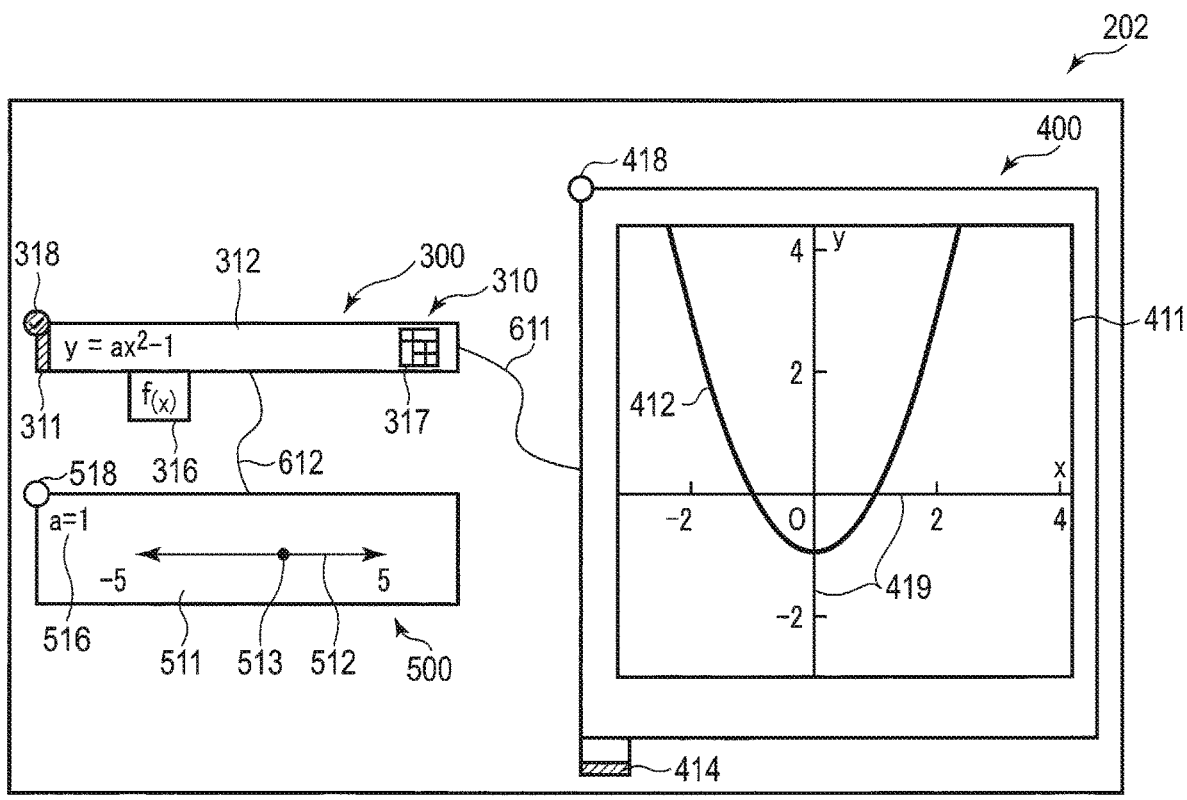
FIG. 4B is a view for describing the operation of creating tags, FIG. 4B illustrating an example of the transition of the screen displayed on the terminal.

The function relating to the graph tag, on which the graph is displayed, will further be described with reference to flowcharts of FIG. 2A, FIG. 2B and FIG. 3 which illustrate processes of the system 1, and screen examples illustrated in FIG. 4A to FIG. 6D. FIG. 4A, FIG. 4B and FIG. 5A illustrate a flow in which a mathematical expression tag is created and a graph tag is created. FIG. 5A to FIG. 5E, and FIG. 6A to FIG. 6D illustrate a flow in which tags are separated, sliders are operated, and tags are coupled.

FIG. 4A illustrates an example of a screen 201 which the terminal 20 displays. FIG. 4A is an example of a screen at a time when some processes among a series of processes to be described below have been progressed. The screen 201 illustrated in FIG. 4A includes a menu display 220. The menu display 220 is a menu which is displayed when a new tag is created. The menu display 220 is displayed, for example, by a right click of the mouse. The menu display 220 includes an arithmetic operation tag icon 221, a mathematical expression tag icon 222, a graph tag icon 223, a numerical table tag icon 224, a geometry tag icon 225, and a memo tag icon 226.

The arithmetic operation tag icon 221 is an icon which is selected at a time of creating an arithmetic operation tag. An equation is input to the arithmetic operation tag, and a solution calculated by the server 10, based on the equation, is displayed on the arithmetic operation tag. The mathematical expression tag icon 222 is an icon which is selected at a time of creating a mathematical expression tag. The mathematical expression tag is a tag to which a mathematical expression relating to a graph, which is to be displayed on the graph tag, is input. The graph tag icon 223 is an icon which is selected at a time of creating a graph tag on which a graph is drawn. The numerical table tag icon 224 is an icon which is selected at a time of creating a numerical table tag that is used for an input of a numerical table. The geometry tag icon 225 is an icon which is selected at a time of creating a geometry tag that is used when a figure, etc. are drawn. The memo tag icon 226 is an icon which is selected at a time of creating a memo tag to which text is input.

In step S101, the terminal 20 determines whether the mathematical expression tag icon 222 was selected or not. When the mathematical expression tag icon 222 is not selected, the process advances to step S102. In step S102, the terminal 20 executes other processes than the process relating to the graph, which is described here. The other processes include not only processes executed by the terminal 20 alone, but also processes executed in cooperation with the server 10. When no process needs to be executed, no process may be executed. Thereafter, the process advances to step S104.

When it is determined in step S101 that the mathematical expression tag icon 222 is selected, the process advances to step S103. In step S103, the terminal 20 causes the display device 26 to display the screen 201 including an empty mathematical expression tag 300. The empty mathematical expression tag 300 (not shown) is the mathematical expression tag 300 in a state in which none of a character, numeral, mathematical expression, etc. is displayed. However, depending on states, a cursor may be displayed.

In step S104, the terminal 20 determines whether an input to the mathematical expression tag 300 is executed or not. When no input is executed, the process advances to step S106. When an input is executed, the process advances to step S105. For example, when the first input area 312 of the mathematical expression tag 300 is selected, the process advances to step S105. At this time, the status display portion 318 of the mathematical expression tag 300 indicates the status in which the mathematical expression tag 300 is selected. In step S105, the terminal 20 causes the screen to display a software keyboard. FIG. 4A illustrates an example of a software keyboard 240 which is displayed on the screen 201, and a state before an equation "$y=ax^2-1$", which is being input to the first input area 312 of the mathematical expression tag 300, is finally determined. A cursor 315 is displayed immediately after the equation "$y=ax^2-1$" in the first input area 312 of the mathematical expression tag 300, and it is indicated that the equation which is being input has not yet been finally determined. The software keyboard 240 includes key displays necessary for inputting a mathematical expression, such as numerical values and mathematical signs. The user performs an input by using the software keyboard 240. The terminal 20 acquires the input to the software keyboard 240. Such a configuration may be adopted that the user can perform an input by using the keyboard of the input device 25. The terminal 20 updates an internal state relating to the mathematical expression tag, such as by updating data in accordance with an input. The terminal 20 updates the display of the mathematical expression tag 300 of the screen 201. Thereafter, the process advances to step S106.

In step S106, the terminal 20 determines whether an instruction relating to graph drawing was input or not. For example, when an EXE key 241 included in the software keyboard 240 is selected in the state in which the mathematical expression tag 300 is selected, it is determined that the instruction relating to graph drawing was input. When the instruction for graph drawing is not input, the process advances to step S110. When the instruction for graph drawing was input, the process advances to step S107.

In step S107, the terminal 20 specifies necessary information, such as the mathematical expression input to the mathematical expression tag 300, and the information of the drawing range of the graph. The terminal 20 transmits the specified information to the server 10.

In step S108, the server 10 receives the information which was transmitted from the terminal 20, and calculates, based on the received information, necessary data for graph drawing, such as coordinates of points which constitute the graph. The server 10 transmits the arithmetic operation result to the terminal 20. The server 10 may store, in a database, necessary part of the acquired information and arithmetic operation result.

In step S109, the terminal 20 creates and displays a graph tag, receives the arithmetic operation result from the server 10, and draws a graph on the graph tag. For example, the terminal 20 displays a graph by connecting the received coordinates of points by a line. In addition, when a character coefficient is included in the mathematical expression input to the mathematical expression tag 300, the slider tag 500 relating to this character coefficient is also created and displayed. The server 10 can judge whether a character coefficient is included in the mathematical expression or not. The terminal 20 receives the judgment result of the server 10, and can judge, based on this result, whether the slider tag 500 is necessary or not. Thereafter, the process advances to step S110.

As a result of the above process, a screen 202 as illustrated in FIG. 4B is displayed. The screen 202 includes, in addition to the mathematical expression tag 300, the graph tag 400 which is associated with the mathematical expression tag 300 by the string 611. The graph tag 400 includes the first graph display area 411. The first graph display area 411 displays the axes 419, on which the set coordinate ranges are displayed, and the first graph 412 corresponding to the mathematical expression input to the first mathematical expression tag 310. In addition, since a character coefficient is included in the mathematical expression input to the mathematical expression tag 300, the screen 202 includes the slider tag 500. As described above, the slider tag 500 includes the slider 511 and the value display area 516 which indicates the value of the character coefficient. The slider 511 is configured such that the marker 513 moves along the axis 512. The value of the character coefficient displayed on the value display area 516 varies in accordance with the position of the marker 513.

As described above, in response to one or more input operations accepted via the input device 25, the CPU 21 of the terminal 20 causes the display device 26 to display one mathematical expression tag 300 including one first mathematical expression "$y=ax^2-1$"; one graph tag 400 associated with the one mathematical expression tag 300, the one graph tag 400 including one first graph 412 representing the mathematical expression "$y=ax^2-1$"; and one slider tag 500 associated with the one graph tag 400, the one slider tag 500 including one slider 511 for changing the numerical value of one character coefficient "a" included in the one mathematical expression "$y=ax^2-1$".

The input of the mathematical expression to the mathematical expression tag 300 and the drawing of the graph in the graph tag 400 in step S104 to step S109 may repeatedly be executed. In the example illustrated in FIG. 4B, the mathematical expression tag 300 is selected, as indicated in the status display portion 318 of the mathematical expression tag 300. When the mathematical expression tag 300 is selected, a mathematical expression tag icon 316 and a numerical table tag icon 317 are displayed on the mathematical expression tag 300, as illustrated in FIG. 4B. The numerical table tag icon 317 is an icon which is selected at a time of creating a numerical table relating to the mathematical expression input to the mathematical expression tag 300. The mathematical expression tag icon 316 is an icon for adding another mathematical expression to the mathematical expression tag 300.

When the mathematical expression tag icon 316 was selected, the process advances from step S101 to step S103. As a result, as illustrated in FIG. 5A, in the mathematical expression tag 300, the second mathematical expression tag 320 is added under the first mathematical expression tag 310.

Note that, as illustrated in FIG. 5A, also when the mathematical expression tag icon 442, which is displayed in the state in which the graph tag 400 is selected, is selected, the second mathematical expression tag 320 is similarly added under the first mathematical expression tag 310.

When an input to the second mathematical expression tag 320 is executed, the process advances from step S104 to step S105. As a result, as illustrated in FIG. 5A, a mathematical expression is input to the second input area 322 of the second mathematical expression tag 320.

When the drawing of the graph is instructed based on this mathematical expression, the process advances from step S106 to step S107 through step S109. As a result, as illustrated in FIG. 5A, the second graph 422 corresponding to the mathematical expression input to the second mathematical expression tag 320 is displayed on the first graph display area 411 of the graph tag 400.

Here, since the second mathematical expression tag 320 is displayed in juxtaposition with the first mathematical expression tag 310, the second graph 422 is displayed together with the first graph 412 on the first graph display area 411.

In FIG. 5A, the color of the first tab 311 of the first mathematical expression tag 310 is the same as the color of the first tab 414 of the graph tag 400. The color of the second tab 321 of the second mathematical expression tag 320 is the same as the color of the second tab 424 of the graph tag 400. It is preferable that the color of the first tab 414 of the graph tag 400 is the same as the color of the first graph 412. It is preferable that the color of the second tab 424 of the graph tag 400 is the same as the color of the second graph 422.

As described above, the mathematical expression tag and graph can be added in accordance with the user's operation.

In the mathematical expression tag 300 illustrated in FIG. 5A, the first mathematical expression tag 310 and second mathematical expression tag 320 are displayed such that the first mathematical expression tag 310 and second mathematical expression tag 320 are coupled to each other or neighbor each other. In the present embodiment, the first mathematical expression tag 310 and second mathematical expression tag 320 may be displayed such that the first mathematical expression tag 310 and second mathematical expression tag 320 are separated or spaced apart from each other. In step S110, the terminal 20 determines whether an instruction relating to separation or coupling of tags was input or not. As illustrated in FIG. 5A, when the user selects the second tab 321 of the mathematical expression tag 300 by a pointer 701 and drags the second tab 321 as indicated by an arrow 721, it is determined that an instruction to separate tags was input. When the instruction relating to the separation or coupling of tags is not input, the process advances to step S112. When the instruction relating to the separation or coupling of tags was input, the process advances to step S111. In step S111, the terminal 20 executes a separation/coupling process. The separation/coupling process will be described with reference to a flowchart of FIG. 3.

In step S201, the terminal 20 determines whether an operation for separation of tags was executed or not. At this time, the tag that is a target of the operation may be either the mathematical expression tag 300 or graph tag 400, as will be described later. When the operation for separation is not executed, the process advances to step S205. When the operation for separation was executed, the process advances to step S202.

In step S202, the terminal 20 determines whether a character coefficient is included in the mathematical expression associated with the tag that is to be separated. The mathematical expression associated with tag that is to be separated is the mathematical expression that is input to the mathematical expression tag of the target of separation, or the mathematical expression that is input to the mathematical expression tag associated with the graph tag of the target of separation. When the character coefficient is included, the process advances to step S203. In step S203, the terminal 20 executes a process of separating the mathematical expression tag, graph tag, and slider tag.

Figure 5B:
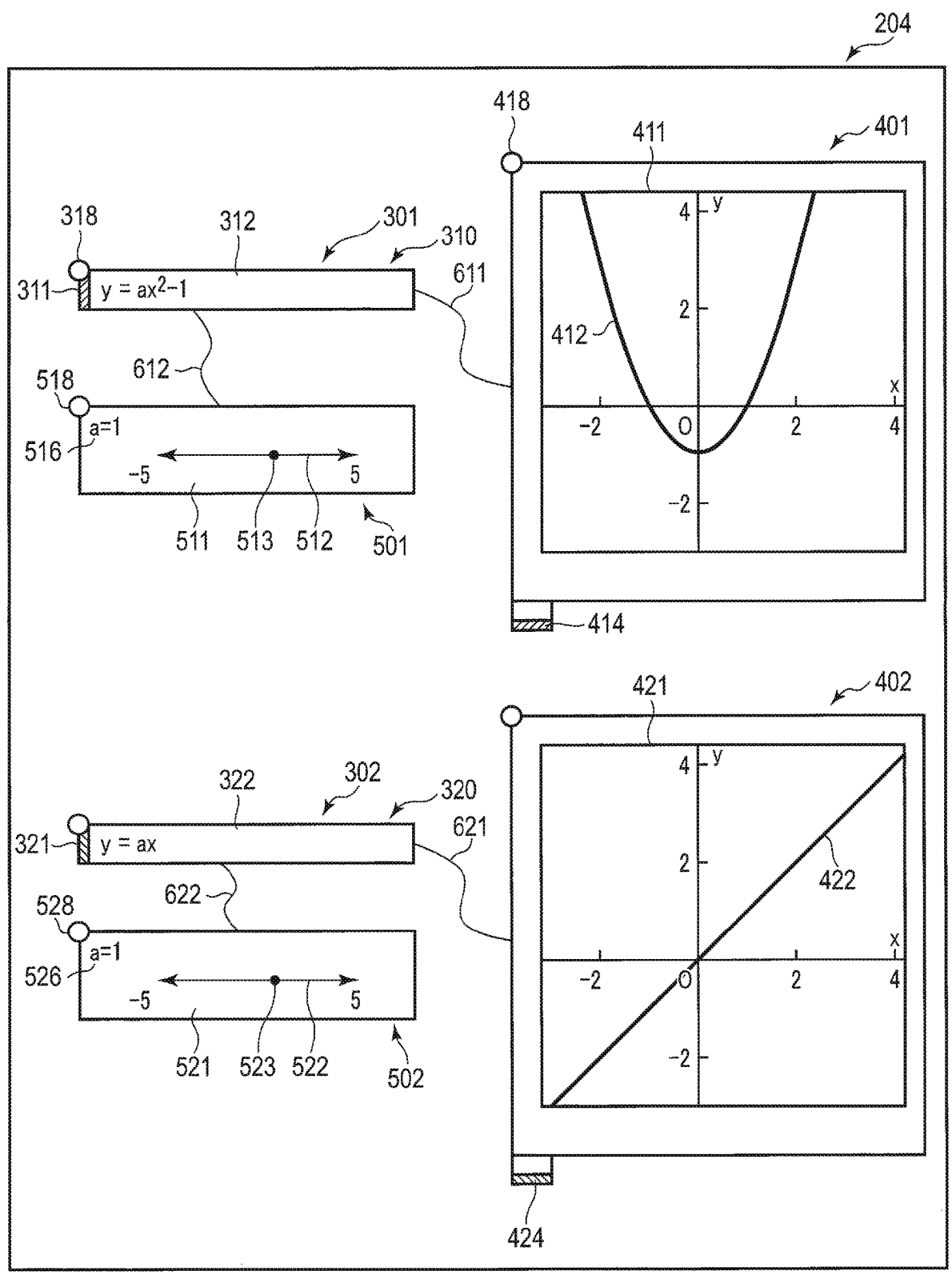
FIG. 5B is a view for describing the separation and coupling of tags, and the change of the coefficient by the slider, FIG. 5B illustrating an example of the transition of the screen displayed on the terminal.

For example, in the example of FIG. 5A, when the second tab 321 of the mathematical expression tag 300 in the screen 203 is dragged and the second mathematical expression tag 320 is separated from the first mathematical expression tag 310, the screen changes to a screen 204 as illustrated in FIG. 5B. Since the second mathematical expression tag 320 is separated from an original mathematical expression tag 301, only the first mathematical expression tag 310 remains in the original mathematical expression tag 301. Accordingly, the second graph 422 is deleted from the first graph display area 411 of the first graph tag 401 which is associated with the original mathematical expression tag 301 by the string 611. Only the first graph 412 remains in the first graph display area 411. In addition, the second tab 424 associated with the second graph 422 is also deleted from the first graph tag 401. Since the character coefficient is included in the equation input to the first input area 312 of the first mathematical expression tag 310 included in the original mathematical expression tag 301, a first slider tag 501, which is associated with the original mathematical expression tag 301 by the string 612, remains as such.

On the other hand, a new mathematical expression tag 302 including the second mathematical expression tag 320, which was separated from the original mathematical expression tag 301, is created and additionally displayed. A second graph tag 402, which is associated with the new mathematical expression tag 302 by a string 621, is created and additionally displayed. The second graph tag includes a second graph display area 421. In the second graph display area 421, the second graph 422 corresponding to the mathematical expression input to the second input area 322 of the second mathematical expression tag 320 is drawn. The second graph tag 402 includes the second tab 424, the color of which is preferably the same as the color of the second graph 422.

Since the character coefficient is included in the equation input to the second input area, a second slider tag 502, which is associated with the new mathematical expression tag 302 by a string 622, is created. The second slider tag 502, like the first slider tag 501, includes a value display area 526 which indicates the value of the character coefficient, and a slider 521 including a marker 523 which moves along an axis 522.

In the example illustrated in FIG. 5B, the common character coefficient "a" is included in the equation input to the first mathematical expression tag 310 and the equation input to the second mathematical expression tag 320. Thus, the first slider tag 501 and second slider tag 502 have the same display content. When a character coefficient is included in only one of the equation input to the first mathematical expression tag 310 and the equation input to the second mathematical expression tag 320, a slider tag, which is associated by a string, is displayed with respect to only one of the first mathematical expression tag 310 and second mathematical expression tag 320, which includes the character coefficient.

As described above, the CPU 21 of the terminal 20 determines whether one or more operations for first separation for mutually separating and displaying one mathematical expression "$y=ax^2-1$" and one mathematical expression "$y=ax$" included in one mathematical expression tag 300, or one or more operations for second separation for mutually separating and displaying one first graph 412 and one second graph 422 included in the one mathematical expression tag 300, are accepted or not. When it is determined that the one or more operations for the first separation, or the one or more operations for the second separation, are accepted, the CPU 21 of the terminal 20 causes the display device 26 to display one first mathematical expression tag 310 including the one mathematical expression "$y=ax^2-1$"; one first graph tag 401 associated with the one first mathematical expression tag 310, the one first graph tag 401 including one first graph 412; one first slider tag 501 associated with the one first graph tag 401; one second mathematical expression tag 320 including the one mathematical expression "$y=ax$"; one second graph tag 402 associated with the one second mathematical expression tag 320, the one second graph tag 402 including one second graph 422; and one second slider tag 502 associated with the one second graph tag 402.

As described above, in response to one or more input operations accepted via the input device, the CPU 21 of the terminal 20 causes the display device 26 to display one first mathematical expression tag 310 including one first mathematical expression "$y=ax^2-1$"; one first graph tag 401 associated with the one first mathematical expression tag 310, the one first graph tag 401 including one first graph 412 representing the mathematical expression "$y=ax^2-1$"; one first slider tag 501 associated with the one first graph tag 401, the one first slider tag 501 including one slider 511 for changing the numerical value of one character coefficient "a" included in the one mathematical expression "$y=ax^2-1$", the one slider 511 corresponding to the character coefficient "a"; one second mathematical expression tag 320 including one second mathematical expression "$y=ax$"; one second graph tag 402 associated with the one second mathematical expression tag 320, the one second graph tag 402 including one second graph 422 representing the mathematical expression "$y=ax$"; and one second slider tag 502 associated with the one second graph tag 402, the one second slider tag 502 including one slider 521 for changing the numerical value of one character coefficient "a" included in the one mathematical expression "$y=ax$", the one slider 521 corresponding to the character coefficient "a". Here, the one second slider tag 502 includes one slider 521 for changing the numerical value of the character coefficient "a" which is of an identical kind to the kind of a character coefficient included in at least the one mathematical expression "$y=ax$".

Figure 6A:
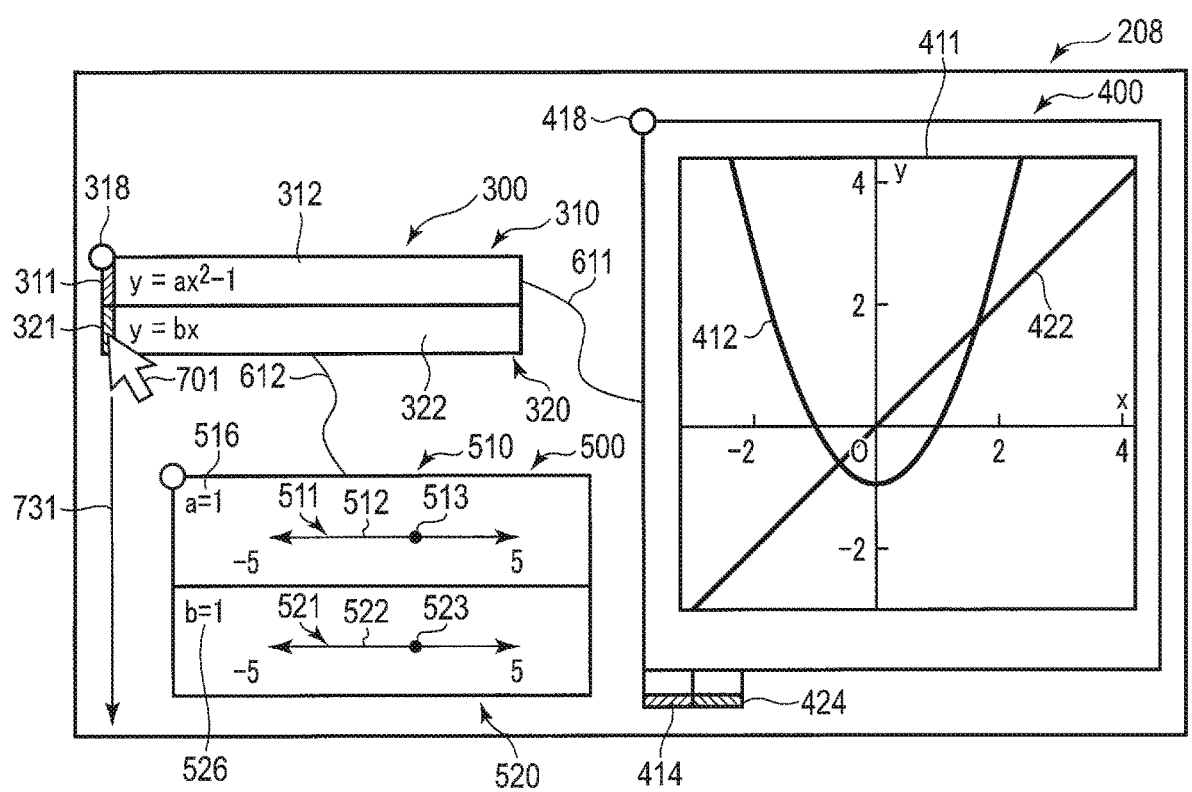
FIG. 6A is a view for describing the separation and coupling of tags, and the change of a coefficient by the slider, FIG. 6A illustrating an example of the transition of the screen displayed on the terminal.

Consideration is now given to the case in which, as illustrated in a screen 208 of FIG. 6A, different character coefficients "a" and "b" are included in the mathematical expression "$y=ax^2-1$" input to the first mathematical expression tag 310 and a mathematical expression "$y=bx$" input to the second mathematical expression tag 320. In this case, the slider tag 500 includes a first slider tag 510 and a second slider tag 520. The mathematical expression input to the first mathematical expression tag 310 includes the character coefficient "a". Thus, the first slider tag 510 includes the slider 511 relating to "a" indicated in the value display area 516. In addition, the mathematical expression input to the second mathematical expression tag 320 includes the character coefficient "b". Thus, the second slider tag 520 includes the slider 521 relating to "b" indicated in the value display area 526. The first slider tag 510 and second slider tag 520 are displayed in juxtaposition.

Figure 6B:
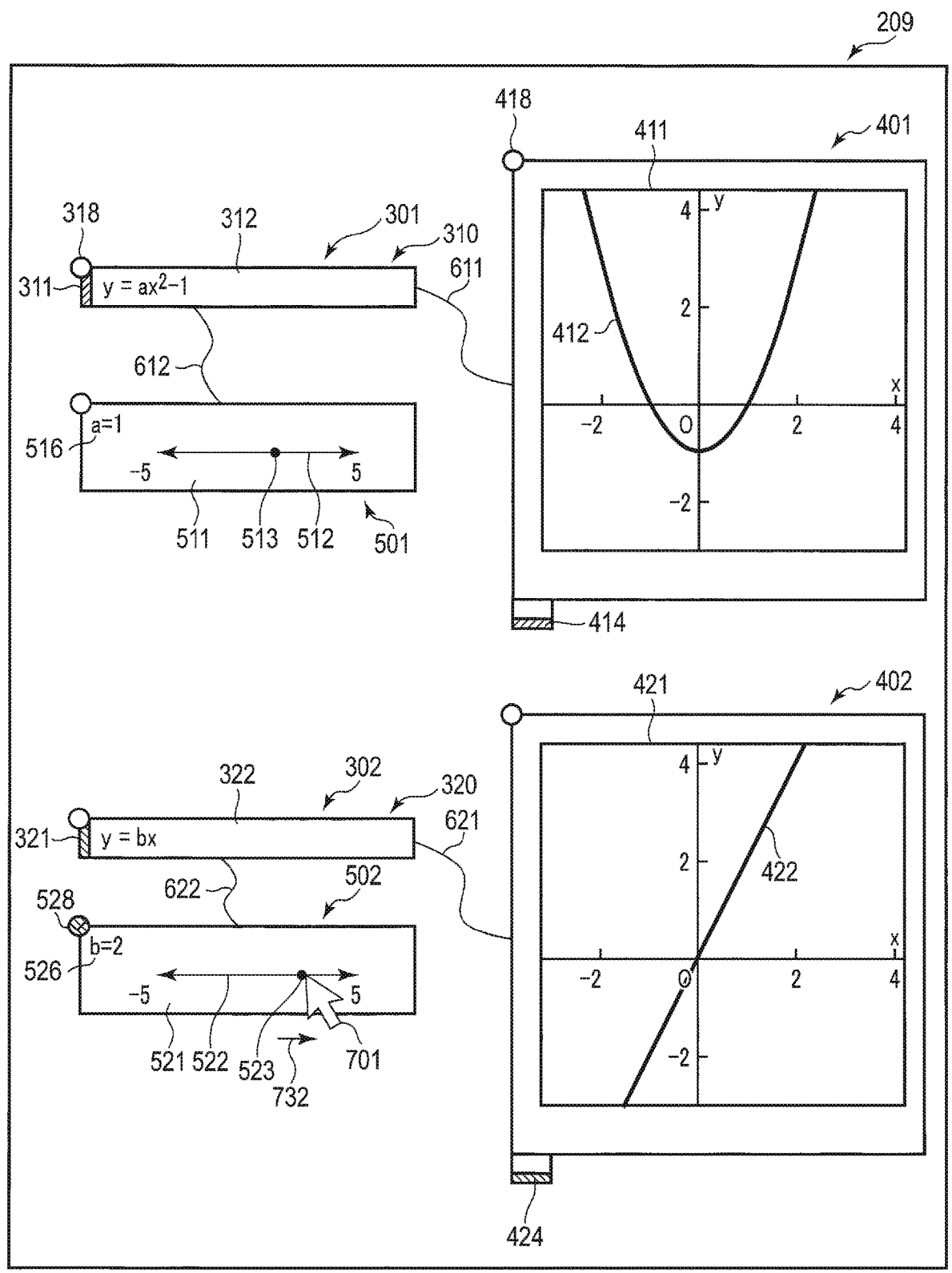
FIG. 6B is a view for describing the separation and coupling of tags, and the change of the coefficient by the slider, FIG. 6B illustrating an example of the transition of the screen displayed on the terminal.

The separation of tags in the case where two slider tags are included as in the screen 208 of FIG. 6A is as follows. As illustrated in FIG. 6A, the user selects the second tab 321 of the second mathematical expression tag 320 by the pointer 701 and drags the second tag as indicated by an arrow 731. Thereby, the second mathematical expression tag 320 is separated from the first mathematical expression tag 310. As a result, the screen changes to a screen 209 as illustrated in FIG. 6B. Specifically, the second mathematical expression tag 320 is deleted from the original mathematical expression tag 301, and the original mathematical expression tag 301 includes only the first mathematical expression tag 310 to which the mathematical expression "$y=ax^2-1$" is input. Accordingly, the first graph tag 401 associated with the first mathematical expression tag 310 displays only the first graph 412 which represents "$y=ax^2-1$." In addition, the first slider 501 associated with the first mathematical expression tag 310, to which the mathematical expression "$y=ax^2-1$" is input, includes the slider 511 relating to "a".

A new mathematical expression tag 302 including the separated second mathematical expression tag 320, to which the mathematical expression "$y=bx$" is input, is created and additionally displayed. A second graph tag 402 associated with the second mathematical expression tag 320 is created and additionally displayed. The second graph tag 402 displays a second graph 422 which represents "$y=bx$." In addition, the second slider tag 502 associated with the second mathematical expression tag 320, to which the mathematical expression "$y=bx$" is input, includes the slider 521 relating to "b".

As described above, the CPU 21 of the terminal 20 determines whether one or more operations for first separation for mutually separating and displaying one mathematical expression "$y=ax^2-1$" and one mathematical expression "$y=bx$" included in one mathematical expression tag 300, or one or more operations for second separation for mutually separating and displaying one first graph 412 and one second graph 422 included in the one mathematical expression tag 300, are accepted or not. When it is determined that the one or more operations for the first separation, or the one or more operations for the second separation, are accepted, the CPU 21 of the terminal 20 causes the display device 26 to display one first mathematical expression tag 310 including the one mathematical expression "$y=ax^2-1$"; one first graph tag 401 associated with the one first mathematical expression tag 310, the one first graph tag 401 including one first graph 412; one first slider tag 501 associated with the one first graph tag 401; one second mathematical expression tag 320 including the one mathematical expression "$y=bx$"; one second graph tag 402 associated with the one second mathematical expression tag 320, the one second graph tag 402 including one second graph 422; and one second slider tag 502 associated with the one second graph tag 402.

FIG. 5A and FIG. 6A illustrate the example in which the second tab 321 of the second mathematical expression tag 320 is selected and the second mathematical expression tag 320 is dragged. The same applies to the case in which the first tab 311 of the first mathematical expression tag 310 is selected and dragged. In this case, the first mathematical expression tag 310 is deleted from the original mathematical expression tag 300, the second mathematical expression tag 320 is left, and the first mathematical expression tag 310 is included in the new mathematical expression tag. At this time, the first graph 412 is deleted from the original graph tag 400, and the second graph 422 is left. The first graph 412 is drawn on the new graph tag which is created in association with the first mathematical expression tag 310 of the new mathematical expression tag.

Besides, the separation operation is not limited to the above-described operation of selecting and dragging the first tab 311 of the first mathematical expression tag 310 or the second tab 321 of the second mathematical expression tag 320. The separation operation may also be implemented by selecting and dragging the first tab 414 or second tab 424 of the graph tag 400. In the state of FIG. 5A, the user selects the second tab 424 of the graph tag 400 by the pointer 701, and drags the second tab 424 as indicated by an arrow 722. In this case, too, the screen changes to the screen 204 as illustrated in FIG. 5B. Specifically, the graph tag is separated into two tags. The first graph 412 is left in the original graph tag, and the second graph 422 is drawn in the new graph tag. Accordingly, the mathematical expression tag is separated into two tags. The first mathematical expression tag 310 is left in the original mathematical expression tag, and the second mathematical expression tag 320 is included in the new mathematical expression tag. The slider tag is copied and is associated with each of the first mathematical expression tag 310 and second mathematical expression tag 320.

As described above, in the terminal 20 of the present embodiment, responding to the execution of one or more operations for separating various kinds of tags which are mutually coupled, a mathematical expression tag is newly created, and the display device 26 is caused to display two mathematical expression tags 301 and 302. In addition, a graph tag is newly created, and the display device 26 is caused to display two graph tags 401 and 402 in association with the two mathematical expression tags 301 and 302. A slider tag corresponding to the character coefficient of the identical kind is newly created, and the display device 26 is caused to display two slider tags 501 and 502 in association with the two mathematical expression tags 301 and 302.

Thereby, one mathematical expression tag 300 can be separated into two mathematical expression tags 301 and 302. Moreover, even after the separation of the mathematical expression tag, it is possible to visually easily grasp the correlation between the mathematical expression tags 301 and 302, the graph tags 401 and 402, and the slider tags 501 and 502.

Referring back to FIG. 3, a further description will be given. In step S202, when it is determined that no character coefficient is present, the process advances to step S204. In step S204, the terminal 20 separates each of the mathematical expression tag and the graph tag. The separation of the mathematical expression tag and graph tag is as described above with reference to FIG. 5B. Since there is no character coefficient, the slider tag is absent. Accordingly, in this case, the process relating to the slider tag is not included. After step S204, the process advances to step S205.

In step S205, the terminal 20 determines whether an operation for coupling of tags was executed or not. At this time, the tag that is the target of the operation may be either the mathematical expression tag or graph tag, as will be described below. When the operation for coupling is not executed, the separation/coupling process is terminated. When the operation for coupling was executed, the process advances to step S206.

In step S206, the terminal 20 determines whether a character coefficient is included in the mathematical expression associated with the tag that is to be coupled. The mathematical expression associated with tag that is to be coupled is the mathematical expression that is input to the mathematical expression tag of the target of coupling, or the mathematical expression that is input to the mathematical expression tag associated with the graph tag of the target of coupling. When the character coefficient is included, the process advances to step S207. In step S207, the terminal 20 determines whether the character coefficients included in the mathematical expressions associated with the tags to be coupled are the same character coefficient or not. When the character coefficients are the same character coefficient, the process advances to step S208.

In step S208, the terminal 20 aligns the mathematical expression tags, integrates the graph tags, and integrates the slider tags. By the above, the separation/coupling process is terminated.

Figure 5C:
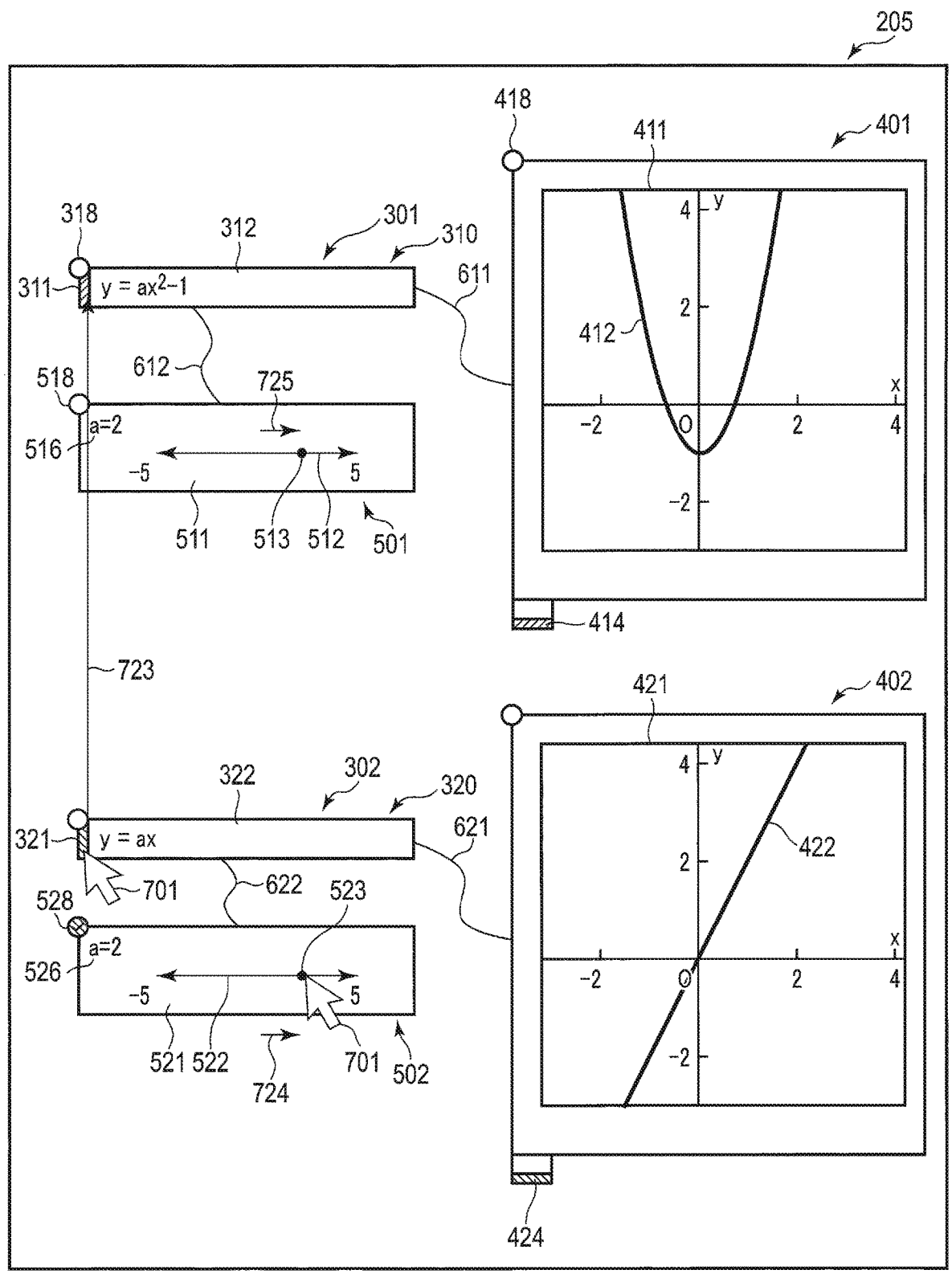
FIG. 5C is a view for describing the separation and coupling of tags, and the change of the coefficient by the slider, FIG. 5C illustrating an example of the transition of the screen displayed on the terminal.
Figure 5D:
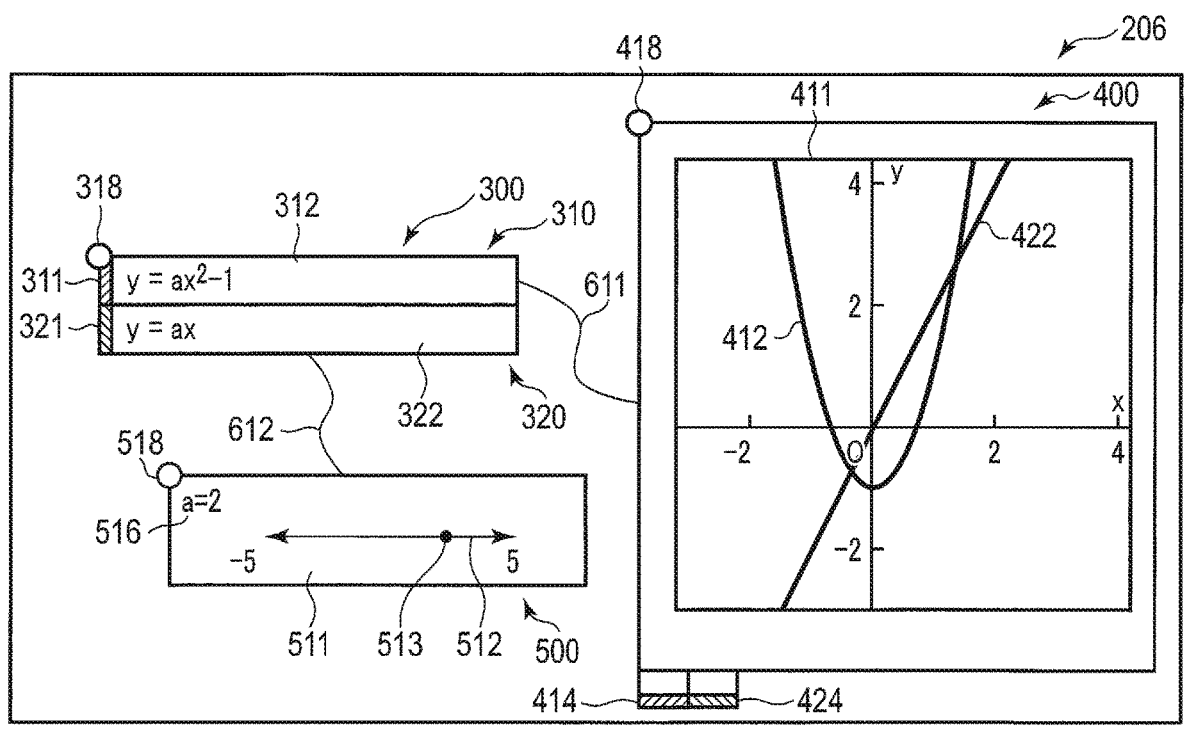
FIG. 5D is a view for describing the separation and coupling of tags, and the change of the coefficient by the slider, FIG. 5D illustrating an example of the transition of the screen displayed on the terminal.

For example, in a screen 205 of FIG. 5C, when the user selects the second tab 321 of the second mathematical expression tag 320 by the pointer 701, drags the second mathematical expression tag 320 as indicated by an arrow 723, and performs the operation of overlapping the second mathematical expression tag 320 with the first mathematical expression tag 310, it is determined that the operation for coupling tags was executed. At this time, as in a screen 206 of FIG. 5D, the first mathematical expression tag 310 and second mathematical expression tag 320 are aligned into a single mathematical expression tag 300. In addition, the first graph tag 401 shown in FIG. 5C, which displays the first graph 412, and the second graph tag 402, which displays the second graph 422, are integrated into a single graph tag 400. As a result, as illustrated in FIG. 5D, the second graph tag 402 is deleted, and the first graph 412 and second graph 422 are displayed on the single graph tag 400. In addition, as illustrated in FIG. 5C, since the first slider tag 501 and second slider tag 502 are identical, these tags are integrated into one slider tag 500, as illustrated in FIG. 5D.

As described above, the CPU 21 of the terminal 20 determines whether one or more operations for first coupling for coupling one first mathematical expression tag 310 and one second mathematical expression tag 320, or one or more operations for second coupling for coupling one first graph tag 401 and one second graph tag 402, are accepted or not. When it is determined that the one or more operations for the first coupling, or the one or more operations for the second coupling, are accepted, the CPU 21 of the terminal 20 causes the display device 26 to display one mathematical expression tag 300 including one mathematical expression "$y=ax^2-1$" and one mathematical expression "$y=ax$"; one graph tag 400 associated with the one mathematical expression tag 300, the one graph tag 400 including one first graph 412 and one second graph 422; and one slider tag 500 associated with the one graph tag 400, the one slider tag 500 including one slider 511 for changing the numerical value of one kind of character coefficient "a" included in the one mathematical expression "$y=ax^2-1$" and the one mathematical expression "$y=ax$", the one slider 511 corresponding to the character coefficient "a".

In step S207, when it is determined that the character coefficients included in the mathematical expressions associated with the tags to be coupled are not the same character coefficient, the process advances to step S209. In step S209, the terminal 20 aligns and displays the mathematical expression tags such that the mathematical expression tags neighbor each other, integrates the graph tags, and aligns and displays the slider tags such that the slider tags neighbor each other. By the above, the separation/coupling process is terminated.

Figure 6C:
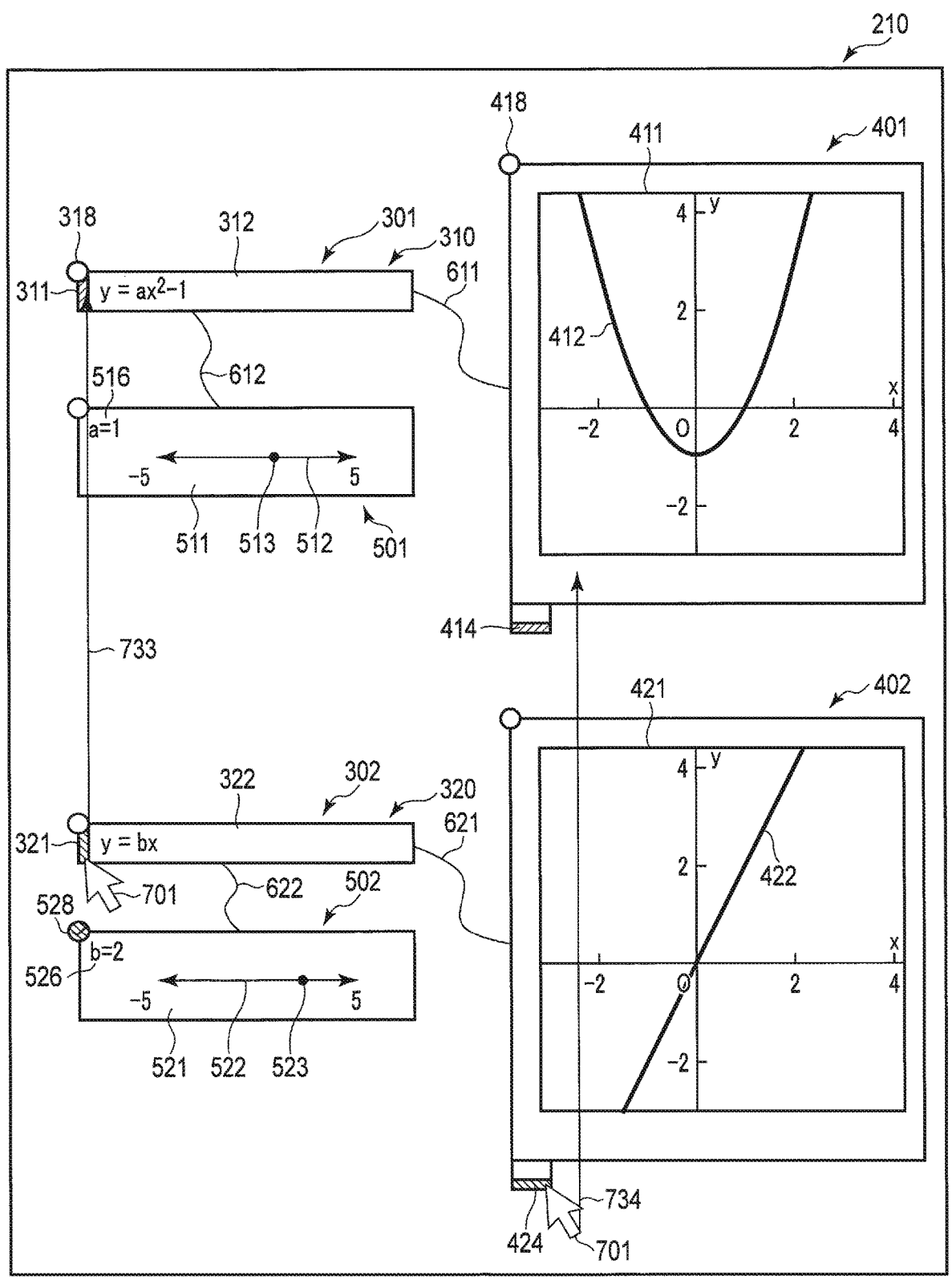
FIG. 6C is a view for describing the separation and coupling of tags, and the change of the coefficient by the slider, FIG. 6C illustrating an example of the transition of the screen displayed on the terminal.

For example, in a screen 210 of FIG. 6C, when the user selects the second tab 321 of the second mathematical expression tag 320 by the pointer 701, drags the second mathematical expression tag 320 as indicated by an arrow 733, and performs the operation of overlapping the second mathematical expression tag 320 with the first mathematical expression tag 310, it is determined that the operation for coupling tags was executed. In addition, as illustrated in FIG. 6C, also when the second tab 424 of the second graph tag 402 is selected by the pointer 701 and the second graph tag 402 is dragged onto the first graph tag 401 as indicated by an arrow 734, it is determined that the operation for coupling tags was executed.

At this time, as in a screen 211 of FIG. 6D, the first mathematical expression tag 310 and second mathematical expression tag 320 are aligned into a single mathematical expression tag 300. In addition, the first graph tag 401 shown in FIG. 6C, which displays the first graph 412, and the second graph tag 402, which displays the second graph 422, are integrated into a single graph tag 400. As a result, as illustrated in FIG. 6D, the second graph tag 402 is deleted, and the first graph 412 and second graph 422 are displayed on the single graph tag 400. In addition, since the first slider tag 501 and second slider tag 502 are different, as illustrated in FIG. 6C, these tags are aligned into one slider tag 500, as illustrated in FIG. 6D.

As described above, the CPU 21 of the terminal 20 determines whether one or more operations for first coupling for coupling one first mathematical expression tag 310 and one second mathematical expression tag 320, or one or more operations for second coupling for coupling one first graph tag 401 and one second graph tag 402, are accepted or not. When it is determined that the one or more operations for the first coupling, or the one or more operations for the second coupling, are accepted, the CPU 21 of the terminal 20 causes the display device 26 to display one mathematical expression tag 300 including one mathematical expression "$y=ax^2-1$" and one mathematical expression "$y=bx$"; one graph tag 400 associated with the one mathematical expression tag 300, the one graph tag 400 including one first graph 412 and one second graph 422; and one slider tag 500 associated with the one graph tag 400, the one slider tag 500 including two sliders 511 and 521 for changing the numerical values of two kinds of character coefficients "a" and "b" included in the one mathematical expression "$y=ax^2-1$" and the one mathematical expression "$y=bx$", the two sliders 511 and 521 corresponding to the character coefficient "a" and "b".

As described above, in the terminal 20 of the present embodiment, responding to the execution of one or more operations for coupling various kinds of tags which are mutually separated, one of two mathematical expression tags 301 and 302 is set in the non-display state, and the display device 26 is caused to display one mathematical expression tag 300. In addition, one of two graph tags 401 and 402 is set in the non-display state, and the display device 26 is caused to display one graph tag 400 in association with the one mathematical expression tag 300. One of two slider tags 501 and 502 is set in the non-display state, and the display device 26 is caused to display one slider tag 500, which corresponds to the identical kind of character coefficient, in association with the one mathematical expression tag 300.

Thereby, the two mathematical expression tags 301 and 302 can be mutually coupled as the one mathematical expression tag 300. Moreover, even after the coupling of the mathematical expression tags, it is possible to visually easily grasp the correlation between the one mathematical expression tag 300, the one graph tag 400, and the one slider tag 500.

In step S206, when it is determined that no character coefficient is present, the process advances to step S210. In step S210, the terminal 20 aligns and displays the mathematical expression tags such that the mathematical expression tags neighbor each other, and integrates the graph tags. Since there is no character coefficient, the slider tag is absent. Accordingly, in this case, the process relating to the slider tag is not included. By the above, the separation/coupling process is terminated.

Referring back to FIG. 2A, a further description will be given. After the separation/coupling process, the process advances to step S112. In step S112, the terminal 20 determines whether an operation of the slider was executed or not. When the operation of the slider is not executed, the process advances to step S118. When the operation of the slider was executed, the process advances to step S113.

In step S113, the terminal 20 determines whether a plurality of identical character coefficients are present. When identical character coefficients are not present, the process advances to step S115. When identical character coefficients are present, the process advances to step S114. In step S114, the terminal 20 executes an interlock process. The interlock process means a process in which when the slider was operated and the value of a character coefficient was changed, the values of identical character coefficients are changed batchwise.

For example, as illustrated in FIG. 5C, when there are the first slider tag 501 and second slider tag 502 which are two slider tags relating to the identical character coefficient "a", the interlock process is executed. For example, a transition from FIG. 5B to FIG. 5C is now considered. At this time, it is assumed that, as indicated by a status display portion 528, the second slider tag 502 was selected, the marker 523 of the second slider tag 502 was designated by the pointer 701, and the operation of dragging the marker 523 was executed as indicated by an arrow 724. By this drag operation, the marker 523 of the second slider tag 502 moves. In accordance with the movement of the marker 523, the value of the character coefficient "a" is changed as indicated in the value display area 526 of the second slider tag 502. In conjunction with this, as indicated by an arrow 725, the position of the marker 513 of the first slider tag 501 changes, and the value of the character coefficient "a" in the value display area 516 of the first slider tag 501 is also changed.

In step S115, the terminal 20 specifies the character coefficient which was changed by the operation of the slider, specifies the changed value of the character coefficient and the mathematical expression including this character coefficient, and transmits the information thereof to the server 10. In step S116, the server 10 receives the information of the mathematical expression, character coefficient, etc., and calculates values for drawing a graph. The server 10 transmits the arithmetic operation result to the terminal 20. In step S117, the terminal 20 receives the arithmetic operation result from the server 10, and executes re-drawing of the graph, based on the arithmetic operation result. Thereafter, the process advances to step S118.

For example, like a transition from FIG. 5B to FIG. 5C, when the value of the character coefficient "a" was changed from "1" to "2" by using one of the separated slider tags, the first graph 412 in the first graph tag 401 and the second graph 422 in the second graph tag 402 are re-drawn in accordance with the change of the value that is substituted for the character coefficient.

As described above, the CPU 21 of the terminal 20 determines whether one or more operations for a numerical value change for changing the numerical value of the character coefficient "a" of the identical kind are accepted or not. When it is determined that the one or more operations for the numerical value change are accepted, the CPU 21 of the terminal 20 moves, in an interlock manner, in response to the one or more operations for the numerical value change, one slider 511 included in one first slider tag 501 and configured to change the numerical value of the character coefficient "a" of the identical kind, and at least one slider 521 included in one second slider tag 502 and configured to change the numerical value of the character coefficient "a" of the identical kind, and displays one first graph 412 included in one first graph tag 401 and one second graph 422 included in one second graph tag 402, by changing shapes of the one first graph 412 and the one second graph 422 in accordance with the one or more operations for the numerical value change.

As described above, in the terminal 20 of the present embodiment, responding to the execution of the one or more operations for changing the numerical value of the character coefficient "a" when the character coefficient "a" of the identical kind is displayed in the mutually separated two slider tags 501 and 502, the display device 26 is caused to display the two graphs 412 and 422, which are displayed in the two graph tags 401 and 402 associated with the two slider tags 501 and 502, by changing shapes of the two graphs 412 and 422 in accordance with the one or more operations for the numerical value change.

Thereby, even when the two graphs 412 and 422 are separately displayed in the two graph tags 401 and 402, if only one slider of any one of the two slider tags 501 and 502 is simply operated, the shapes of the two graphs 412 and 422 can be changed in accordance with this operation.

Figure 5E:
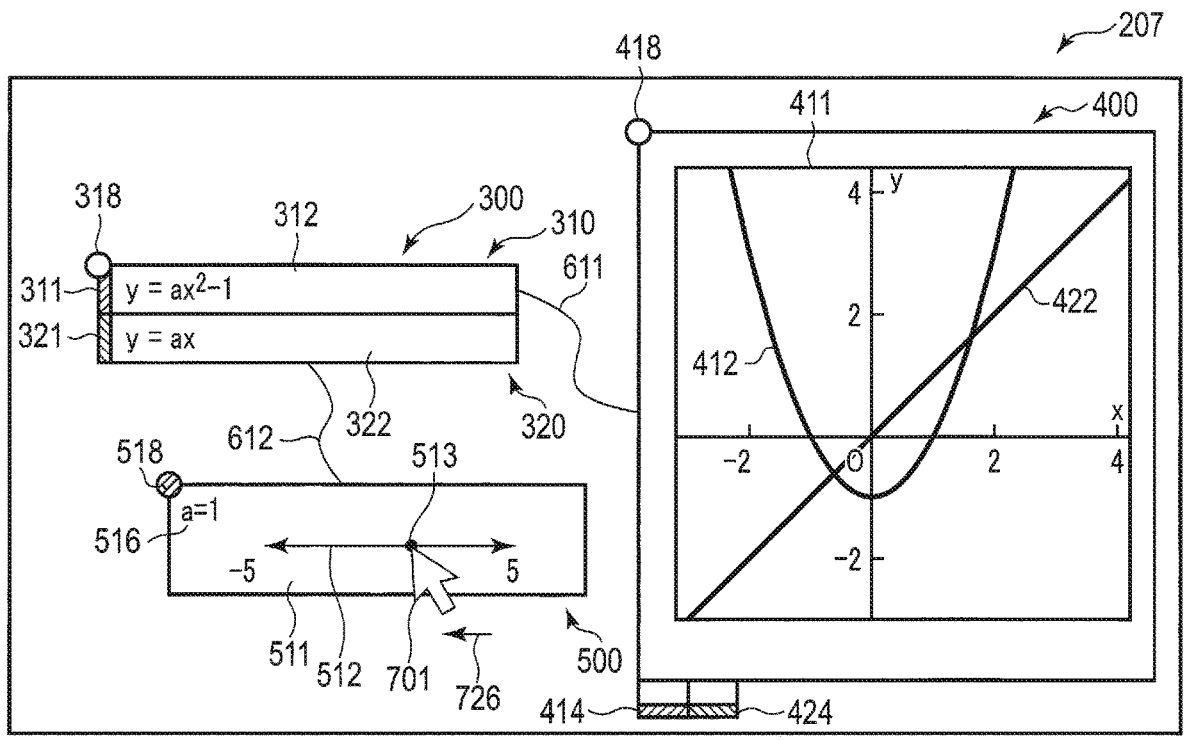
FIG. 5E is a view for describing the separation and coupling of tags, and the change of the coefficient by the slider, FIG. 5E illustrating an example of the transition of the screen displayed on the terminal.

For example, a transition from the screen 206 of FIG. 5D to the screen 207 of FIG. 5E is now considered. At this time, it is assumed that the integrated slider tag 500 was selected as indicated by the status display portion 518, and the value of the character coefficient was changed by using the slider tag 500. Specifically, it is assumed that the user selected the marker 513 by the pointer 701 and dragged the marker 513 as indicated by an arrow 726. In this case, the first graph 412 corresponding to the mathematical expression input to the first mathematical expression tag 310 and the second graph 422 corresponding to the mathematical expression input to the second mathematical expression tag 320 are changed at the same time.

As in the example of the screen 209 illustrated in FIG. 6B, when identical character coefficients are not present, the interlock process is not executed. As illustrated in FIG. 6B, when the value of the character coefficient "b" was changed by the operation of the second slider tag 502, i.e. by selecting the marker 523 by the pointer 701 and dragging the marker 523 as indicated by an arrow 732, this operation affects only the character coefficient "b". Only the second graph 422 of the second graph tag 402 corresponding to the mathematical expression, which includes the character coefficient "b" and is input to the second mathematical expression tag 320, is re-calculated and re-drawn. Similarly, when the tags are coupled as illustrated in FIG. 6D, the character coefficients "a" and "b" are independent from each other, and the first graph 412 and second graph 422 of the graph tag 400 are individually re-drawn in association with the character coefficients "a" and "b".

Referring back to FIG. 2B, a further description will be given. In step S118, the terminal 20 determines whether the present process is terminated or not. When it is determined that the process is not terminated, the process returns to step S101, and the above-described process is repeated. When it is determined that the process is terminated, the process ends.

According to the present embodiment, the user can perform such an intuitive operation as changing a character coefficient by using the slider tag. In the operation using the slider tag, it is judged whether a common character coefficient is used or not. When a common character coefficient is used, a plurality of tags are changed in an interlock manner with respect to the common character coefficient. In addition, in the separation or coupling of tags, a display matching with the user's intuition is executed based on whether the common character coefficient is used or not, in such a manner that a copy of a slider tag is created, a slider tag is separated, slider tags are integrated into one slider tag, or slider tags are displayed in juxtaposition. A series of images as described above are projected by a projector, for example, in a classroom, and are shown to students, for example. Thereby, it is expected that the understanding of mathematics by the students is deepened.

In the above-described embodiment, the system 1 was described as operating by the server 10 and terminal 20 which are connected by the network 50. The sharing of processing between the server 10 and terminal 20 is not limited to the above-described one, and may be changed as needed. Besides, the application software, which executes the above-described functions, may be installed in a terminal such as a PC or a tablet-type information processing apparatus, and the functions may be executed by only the terminal, without intervention of the server 10. Specifically, each element of the above-described functions is realized by the server 10 and/or the computer including the terminal 20.

In the above-described embodiment, the application for education of mathematics was illustrated by way of example, but the embodiment is not limited to this. The above-described technology is applicable to various applications for education. Furthermore, the above-described technology is applicable not only to applications for education, but also to other various kinds of applications such as applications for analysis. In particular, the above technology is applicable to applications in the fields of science, such as mathematics, physics, chemistry, etc., or to applications in the field of engineering.

The present invention is not limited to the above-described embodiments, and can be variously modified without departing from the scope of the present invention in practical stages. The embodiments may be appropriately combined as much as possible and practiced and, in this case, the combined advantageous effects can be obtained. Furthermore, the above-described embodiments incorporate inventions of various stages, and various inventions can be extracted by combinations of constituent elements selected from the disclosed constituent elements. For example, even if some constituent elements are omitted from all the constituent elements disclosed in the embodiments, a configuration from which some constituent elements are omitted can be extracted as an invention if the problem is solved and the advantageous effects can be obtained.

What is claimed is:

1. A non-transitory recording medium having a program recorded thereon for causing a computer to at least perform:
   causing a display to display, in response to one or more input operations received via an input device, a first mathematical expression display area including a first mathematical expression;
   a first graph display area including a first graph corresponding to the first mathematical expression;
   a first slider display area including one or more sliders each for changing a numerical value of each of one or more kinds of character coefficients included in the first mathematical expression, the one or more sliders of the first slider display area corresponding to the one or more kinds of character coefficients included in the first mathematical expression on one-to-one basis, and a number of the one or more sliders of the first slider display area being equal to a number of the one or more kinds of character coefficients included in the first mathematical expression;
   a second mathematical expression display area separate from the first mathematical expression display area, the second mathematical expression display area including a second mathematical expression,
   a second graph display area separate from the first graph display area, the second graph display area including a second graph corresponding to the second mathematical expression; and
   a second slider display area separate from the first slider display area, the second slider display area including one or more sliders for changing a numerical value of each of one or more kinds of character coefficients included in the second mathematical expression, the one or more sliders of the second slider display area corresponding to the one or more kinds of character coefficients included in the second mathematical expression, a number of the one or more sliders of the second slider display area being equal to a number of the one or more kinds of character coefficients included in the second mathematical expression;
   determining whether one or more operations for first coupling by moving the first mathematical expression display area to at least partially overlap the second mathematical expression display area, or one or more operations for second coupling by moving the first graph display area to at least partially overlap the second graph display area, are received; and
   in response to determining that the one or more operations for the first coupling or the second coupling are received, causing the display to display:
   a third mathematical expression display area including the first mathematical expression and the second mathematical expression;
   a third graph display area including the first graph and the second graph, instead of the first graph display area and the second graph display area; and
   a third slider display area;
   in response to determining a character coefficient included in the first mathematical expression and a character coefficient included in the second mathematical expression are not identical, including, in the third slider display area, the one or more sliders each for changing the numerical value of the each of the one or more kinds of character coefficient included in the first mathematical expression and the one or more sliders for changing the numerical value of the each of the one or more kinds of character coefficients included in the second mathematical expression;
   in response to determining the character coefficient included in the first mathematical expression and the character coefficient included in the second mathematical expression are identical, including, in the third slider display area, an integrated slider, wherein the integrated slider changes, simultaneously in the first graph and the second graph, a numerical value associated with the character coefficient included in the first mathematical expression and the character coefficient included in the second mathematical expression.

2. The non-transitory recording medium of claim 1, wherein the program causes the computer to further perform:
   determining whether a kind of character coefficient of the one or more kinds of character coefficients included in the first mathematical expression is identical to a kind of character coefficient of the one or more kinds of character coefficients included in the second mathematical expression; and
   in response to determining that the kind of character coefficient included in the first mathematical expression is identical to the kind of character coefficient included in the second mathematical expression:
   determining whether one or more operations to a slider of the one or more sliders in one of the first slider display area or the second slider display area for a numerical value change for changing the numerical value of the kind of character coefficient in the one of the first slider display area or the second slider display area to a predetermined value are accepted; and
   in response to determining that the one or more operations to the slider of the one or more sliders in the one of the first slider display area or the second slider display area are accepted, moving a corresponding slider in the other of the first slider display area or the second slider display area for a numerical value change for changing the numerical value of the kind of character coefficient in the other of the first slider display area or the second slider display area to the predetermined value.

3. The non-transitory recording medium of claim 1, wherein the program causes the computer to further perform:
   determining whether one or more operations for first separation for mutually separating and displaying the first mathematical expression and the second mathematical expression included in the third mathematical expression display area, or one or more operations for second separation for mutually separating and displaying the first graph and the second graph included in the third graph display area, are received; and in response to determining that the one or more operations for the first separation, or the one or more operations for the second separation, are received, causing the display to display:

the first mathematical expression display area including the first mathematical expression;

the first graph display area including the first graph;

the first slider display area including the one or more sliders each for changing the numerical value of the each of one or more kinds of character coefficients included in the first mathematical expression;

the second mathematical expression display area including the second mathematical expression;

the second graph display area including the second graph; and the second slider display area including the one or more sliders each for changing the numerical value of the each of one or more kinds of character coefficients included in the second mathematical expression.

4. A server comprising one or more processors, wherein the one or more processors are configured to store a program in a storage and to transmit the program to a client terminal that communicates with the server apparatus via a network, wherein the program causes a computer to at least perform:

causing a display to display, in response to one or more input operations received via an input device, a first mathematical expression display area including a first mathematical expression;

a first graph display area including a first graph corresponding to the first mathematical expression;

a first slider display area including one or more sliders each for changing a numerical value of each of one or more kinds of character coefficients included in the first mathematical expression, the one or more sliders of the first slider display area corresponding to the one or more kinds of character coefficients included in the first mathematical expression on one-to-one basis, and a number of the one or more sliders of the first slider display area being equal to a number of the one or more kinds of character coefficients included in the first mathematical expression;

a second mathematical expression display area separate from the first mathematical expression display area, the second mathematical expression display area including a second mathematical expression, a second graph display area separate from the first graph display area, the second graph display area including a second graph corresponding to the second mathematical expression; and a second slider display area separate from the first slider display area, the second slider display area including one or more sliders for changing a numerical value of each of one or more kinds of character coefficients included in the second mathematical expression, the one or more sliders of the second slider display area corresponding to the one or more kinds of character coefficients included in the second mathematical expression, a number of the one or more sliders of the second slider display area being equal to a number of the one or more kinds of character coefficients included in the second mathematical expression;

determining whether one or more operations for first coupling by moving the first mathematical expression display area to at least partially overlap the second mathematical expression display area, or one or more operations for second coupling by moving the first graph display area to at least partially overlap the second graph display area, are received; and in response to determining that the one or more operations for the first coupling or the second coupling are received, causing the display to display:

a third mathematical expression display area including the first mathematical expression and the second mathematical expression;

a third graph display area including the first graph and the second graph, instead of the first graph display area and the second graph display area; and a third slider display area;

in response to determining a character coefficient included in the first mathematical expression and a character coefficient included in the second mathematical expression are not identical, including, in the third slider display area, the one or more sliders each for changing the numerical value of the each of the one or more kinds of character coefficient included in the first mathematical expression and the one or more sliders for changing the numerical value of the each of the one or more kinds of character coefficients included in the second mathematical expression;

in response to determining the character coefficient included in the first mathematical expression and the character coefficient included in the second mathematical expression are identical, including, in the third slider display area, an integrated slider, wherein the integrated slider changes, simultaneously in the first graph and the second graph, a numerical value associated with the character coefficient included in the first mathematical expression and the character coefficient included in the second mathematical expression.

5. The server of claim 4, wherein the program causes the computer to further perform:

determining whether a kind of character coefficient of the one or more kinds of character coefficients included in the first mathematical expression is identical to a kind of character coefficient of the one or more kinds of character coefficients included in the second mathematical expression; and in response to determining that the kind of character coefficient included in the first mathematical expression is identical to the kind of character coefficient included in the second mathematical expression:

determining whether one or more operations to a slider of the one or more sliders in one of the first slider display area or the second slider display area for a numerical value change for changing the numerical value of the kind of character coefficient in the one of the first slider display area or the second slider display area to a predetermined value are accepted; and in response to determining that the one or more operations to the slider of the one or more sliders in the one of the first slider display area or the second slider display area are accepted, moving a corresponding slider in the other of the first slider display area or the second slider display area for a numerical value change for changing the numerical value of the kind of character coefficient in the other of the first slider display area or the second slider display area to the predetermined value.

6. The server of claim 4, wherein the program causes the computer to further perform:
determining whether one or more operations for first separation for mutually separating and displaying the first mathematical expression and the second mathematical expression included in the third mathematical expression display area, or one or more operations for second separation for mutually separating and displaying the first graph and the second graph included in the third graph display area, are received; and
in response to determining that the one or more operations for the first separation, or the one or more operations for the second separation, are received, causing the display to display:
the first mathematical expression display area including the first mathematical expression;
the first graph display area including the first graph;
the first slider display area including the one or more sliders each for changing the numerical value of the each of one or more kinds of character coefficients included in the first mathematical expression;
the second mathematical expression display area including the second mathematical expression;
the second graph display area including the second graph; and
the second slider display area including the one or more sliders each for changing the numerical value of the each of one or more kinds of character coefficients included in the second mathematical expression.

7. A function graph display control apparatus comprising:
a processor; and
a storage,
the processor being configured, by instructions stored in the storage, to at least perform:
causing a display to display, in response to one or more input operations received via an input device,
a first mathematical expression display area including a first mathematical expression;
a first graph display area including a first graph corresponding to the first mathematical expression;
a first slider display area including one or more sliders each for changing a numerical value of each of one or more kinds of character coefficients included in the first mathematical expression, the one or more sliders of the first slider display area corresponding to the one or more kinds of character coefficients included in the first mathematical expression on one-to-one basis, and a number of the one or more sliders of the first slider display area being equal to a number of the one or more kinds of character coefficients included in the first mathematical expression;
a second mathematical expression display area separate from the first mathematical expression display area, the second mathematical expression display area including a second mathematical expression,
a second graph display area separate from the first graph display area, the second graph display area including a second graph corresponding to the second mathematical expression; and
a second slider display area separate from the first slider display area, the second slider display area including one or more sliders for changing a numerical value of each of one or more kinds of character coefficients included in the second mathematical expression, the one or more sliders of the second slider display area corresponding to the one or more kinds of character coefficients included in the second mathematical expression, a number of the one or more sliders of the second slider display area being equal to a number of the one or more kinds of character coefficients included in the second mathematical expression;
determining whether one or more operations for first coupling by moving the first mathematical expression display area to at least partially overlap the second mathematical expression display area, or one or more operations for second coupling by moving the first graph display area to at least partially overlap the second graph display area, are received; and
in response to determining that the one or more operations for the first coupling or the second coupling are received, causing the display to display:
a third mathematical expression display area including the first mathematical expression and the second mathematical expression;
a third graph display area including the first graph and the second graph, instead of the first graph display area and the second graph display area; and
a third slider display area;
in response to determining a character coefficient included in the first mathematical expression and a character coefficient included in the second mathematical expression are not identical, including, in the third slider display area, the one or more sliders each for changing the numerical value of the each of the one or more kinds of character coefficient included in the first mathematical expression and the one or more sliders for changing the numerical value of the each of the one or more kinds of character coefficients included in the second mathematical expression;
in response to determining the character coefficient included in the first mathematical expression and the character coefficient included in the second mathematical expression are identical, including, in the third slider display area, an integrated slider, wherein the integrated slider changes, simultaneously in the first graph and the second graph, a numerical value associated with the character coefficient included in the first mathematical expression and the character coefficient included in the second mathematical expression.

8. The function graph display control apparatus of claim 7, wherein the processor is configured, by the instructions stored in the storage, to further perform:
determining whether a kind of character coefficient of the one or more kinds of character coefficients included in the first mathematical expression is identical to a kind of character coefficient of the one or more kinds of character coefficients included in the second mathematical expression; and
in response to determining that the kind of character coefficient included in the first mathematical expression is identical to the kind of character coefficient included in the second mathematical expression:
determining whether one or more operations to a slider of the one or more sliders in one of the first slider display area or the second slider display area for a numerical value change for changing the numerical value of the kind of character coefficient in the one of the first slider display area or the second slider display area to a predetermined value are accepted; and
in response to determining that the one or more operations to the slider of the one or more sliders in the one of the first slider display area or the second slider display area are accepted, moving a corresponding slider in the other of the first slider display area or the second slider display area for a numerical value change for changing the numerical value of the kind of character coefficient in the other of the first slider display area or the second slider display area to the predetermined value.

9. The function graph display control apparatus of claim 7, wherein the processor is configured, by the instructions stored in the storage, to further perform:
determining whether one or more operations for first separation for mutually separating and displaying the first mathematical expression and the second mathematical expression included in the third mathematical expression display area, or one or more operations for second separation for mutually separating and displaying the first graph and the second graph included in the third graph display area, are received; and
in response to determining that the one or more operations for the first separation, or the one or more operations for the second separation, are received, causing the display to display:
the first mathematical expression display area including the first mathematical expression;
the first graph display area including the first graph;
the first slider display area including the one or more sliders each for changing the numerical value of the each of one or more kinds of character coefficients included in the first mathematical expression;
the second mathematical expression display area including the second mathematical expression;
the second graph display area including the second graph; and
the second slider display area including the one or more sliders each for changing the numerical value of the each of one or more kinds of character coefficients included in the second mathematical expression.

10. A function graph display control method comprising:
causing a display to display, in response to one or more input operations received via an input device, a first mathematical expression display area including a first mathematical expression;
a first graph display area including a first graph corresponding to the first mathematical expression;
a first slider display area including one or more sliders each for changing a numerical value of each of one or more kinds of character coefficients included in the first mathematical expression, the one or more sliders of the first slider display area corresponding to the one or more kinds of character coefficients included in the first mathematical expression on one-to-one basis, and a number of the one or more sliders of the first slider display area being equal to a number of the one or more kinds of character coefficients included in the first mathematical expression;
a second mathematical expression display area separate from the first mathematical expression display area, the second mathematical expression display area including a second mathematical expression,
a second graph display area separate from the first graph display area, the second graph display area including a second graph corresponding to the second mathematical expression; and
a second slider display area separate from the first slider display area, the second slider display area including one or more sliders for changing a numerical value of each of one or more kinds of character coefficients included in the second mathematical expression, the one or more sliders of the second slider display area corresponding to the one or more kinds of character coefficients included in the second mathematical expression, a number of the one or more sliders of the second slider display area being equal to a number of the one or more kinds of character coefficients included in the second mathematical expression;
determining that one or more operations for first coupling by moving the first mathematical expression display area to at least partially overlap the second mathematical expression display area, or one or more operations for second coupling by moving the first graph display area to at least partially overlap the second graph display area, are received; and
in response to determining that the one or more operations for the first coupling or the second coupling are received, causing the display to display:
a third mathematical expression display area including the first mathematical expression and the second mathematical expression;
a third graph display area including the first graph and the second graph, instead of the first graph display area and the second graph display area; and
a third slider display area;
in response to determining a character coefficient included in the first mathematical expression and a character coefficient included in the second mathematical expression are not identical, including, in the third slider display area, the one or more sliders each for changing the numerical value of the each of the one or more kinds of character coefficient included in the first mathematical expression and the one or more sliders for changing the numerical value of the each of the one or more kinds of character coefficients included in the second mathematical expression;
in response to determining the character coefficient included in the first mathematical expression and the character coefficient included in the second mathematical expression are identical, including, in the third slider display area, an integrated slider, wherein the integrated slider changes, simultaneously in the first graph and the second graph, a numerical value associated with the character coefficient included in the first mathematical expression and the character coefficient included in the second mathematical expression.

11. The function graph display control method of claim 10, further comprising:
determining whether a kind of character coefficient of the one or more kinds of character coefficients included in the first mathematical expression is identical to a kind of character coefficient of the one or more kinds of character coefficients included in the second mathematical expression; and in response to determining that the kind of character coefficient included in the first mathematical expression is identical to the kind of character coefficient included in the second mathematical expression:
  determining whether one or more operations to a slider of the one or more sliders in one of the first slider display area or the second slider display area for a numerical value change for changing the numerical value of the kind of character coefficient in the one of the first slider display area or the second slider display area to a predetermined value are accepted; and
  in response to determining that the one or more operations to the slider of the one or more sliders in the one of the first slider display area or the second slider display area are accepted, moving a corresponding slider in the other of the first slider display area or the second slider display area for a numerical value change for changing the numerical value of the kind of character coefficient in the other of the first slider display area or the second slider display area to the predetermined value.

12. The function graph display control method of claim 10, further comprising:
  determining whether one or more operations for first separation for mutually separating and displaying the first mathematical expression and the second mathematical expression included in the third mathematical expression display area, or one or more operations for second separation for mutually separating and displaying the first graph and the second graph included in the third graph display area, are received; and
  in response to determining that the one or more operations for the first separation, or the one or more operations for the second separation, are received, causing the display to display:
    the first mathematical expression display area including the first mathematical expression;
    the first graph display area including the first graph;
    the first slider display area including the one or more sliders each for changing the numerical value of the each of one or more kinds of character coefficients included in the first mathematical expression;
    the second mathematical expression display area including the second mathematical expression;
    the second graph display area including the second graph; and
    the second slider display area including the one or more sliders each for changing the numerical value of the each of one or more kinds of character coefficients included in the second mathematical expression.

13. The non-transitory recording medium of claim 1, wherein the program causes the computer to further perform:
  causing the display to display:
    one or more string representations connecting the first mathematical expression display area, the first graph display area and the first slider display area; and
    one or more string representations connecting the second mathematical expression display area, the second graph display area and the second slider display area.

14. The non-transitory recording medium of claim 1, wherein the program causes the computer to further perform simultaneously displaying the first mathematical expression, the first graph and the one or more sliders of the first slider display area, the second mathematical expression, the second graph and the one or more sliders of the second slider display area.

* * * * *